United States Patent

Toyoshima et al.

[11] Patent Number: 6,092,592
[45] Date of Patent: Jul. 25, 2000

[54] AIR CONDITIONER FOR VEHICLE

[75] Inventors: Takashi Toyoshima; Kazushi Shikata, both of Kariya, Japan

[73] Assignee: Denso Corporation, Kariya, Japan

[21] Appl. No.: 09/321,344

[22] Filed: May 27, 1999

[30] Foreign Application Priority Data

May 28, 1998 [JP] Japan ................................. 10-147863

[51] Int. Cl.[7] .............................. F25B 29/00; B60H 1/00
[52] U.S. Cl. ............................. 165/204; 165/42; 165/43; 454/121; 454/126; 454/156; 454/160; 454/161; 237/12.3 A; 237/12.3 B
[58] Field of Search .............................. 165/42, 43, 204; 237/12.3 A, 12.3 B; 454/121, 126, 156, 160, 161

[56] References Cited

U.S. PATENT DOCUMENTS

| 4,842,047 | 6/1989 | Sakurada et al. | 165/43 |
| 4,899,809 | 2/1990 | Takenaka et al. | 165/43 |
| 4,940,083 | 7/1990 | Takenaka et al. | 165/43 |
| 5,309,731 | 5/1994 | Nonoyama et al. | 62/244 |
| 5,735,338 | 4/1998 | Chevroulet et al. | 165/43 |
| 5,950,711 | 9/1999 | Bendell | 165/42 |

FOREIGN PATENT DOCUMENTS

| 10-181332 | 7/1998 | Japan. |
| 10-181336 | 7/1998 | Japan. |
| 1369428 | 10/1974 | United Kingdom ..................... 165/43 |

Primary Examiner—John K. Ford
Attorney, Agent, or Firm—Harness, Dickey & Pierce, PLC

[57] ABSTRACT

In an air conditioner for a vehicle, a temperature control unit includes a first air mixing door for adjusting an opening degree of a cool air passage through which air having passed through an evaporator bypasses a heater core, and a second air mixing door for adjusting an opening degree of an air inlet portion of the heater core. At least the second air mixing door between the first and second air mixing doors is a butterfly door having a rotation shaft at a center in a door width direction. When an inside/outside air double-layer flow mode is set, the second door partitions an air passage between the evaporator and the heater core into a first air passage through which outside air flows and a second air passage through which inside air flows while fully opening the air inlet portion of the heater core. Thus, in the air conditioner, a distance between the evaporator and the heater core is reduced while partition performance between inside air and outside air due to the second air mixing door is improved.

20 Claims, 17 Drawing Sheets

AIR CONDITIONER FOR VEHICLE

CROSS-REFERENCE TO RELATED APPLICATION

This application is related to and claims priority from Japanese Patent Application No. Hei. 10-147863 filed on May 28, 1998.

BACKGROUND OF THE INVENTION

1. Field of the Invention

The present invention relates to an air conditioner for a vehicle, in which inside air flows into a foot opening portion and outside air flows into a defroster opening portion when an inside/outside air double-layer flow mode is set during an air outlet mode where air is blown from both of the foot opening portion and the defroster opening portion.

2. Description of Related Art

In recent years, because a vehicle engine is effectively operated, temperature of cooling water for cooling the engine becomes lower, and heating capacity of a vehicle air conditioner becomes insufficient.

To overcome this problem, in a conventional air conditioner, when an inside/outside air double-layer flow mode is set in a maximum heating mode, inside air (i.e., air inside a passenger compartment) having a high temperature is heated in a hot water type heater core, and is blown toward the foot area of a passenger in the passenger compartment from a foot opening portion. At the same time, outside air (i.e., air outside the passenger compartment) having a low humidity is heated in the heater core and is blown toward a windshield from a defroster opening portion. In the conventional air conditioner, when the double-layer flow mode is set, an air mixing door for adjusting the temperature of air blown into the passenger compartment is used as a partition member for partitioning inside air and outside air between an evaporator and the heater core, so that structure of the air conditioner becomes simple. However, in the conventional air conditioner, a distance between the evaporator and the heater core is increased due to the air mixing door, and a clearance is formed between the evaporator and a top end of the air mixing door during the double-layer flow mode. Thus, the size of the air conditioner is increased, and the partition between inside air and outside air is insufficient during the double-layer flow mode so that defrosting performance of the windshield is decreased due to inside air being introduced into the defroster opening portion.

SUMMARY OF THE INVENTION

In view of the foregoing problems, it is a first object of the present invention to provide an air conditioner for a vehicle, in which a temperature control unit is used as a partition member for partitioning inside air and outside air during a double-layer flow mode, while a distance between a cooling heat exchanger and a heating heat exchanger is reduced.

It is a second object of the present invention to provide an air conditioner for a vehicle, in which inside air and outside air between a cooling heat exchanger and a heating heat exchanger are sufficiently partitioned by a temperature control unit during a double-layer flow mode.

According to the present invention, an air conditioner for a vehicle includes a temperature control unit for adjusting the temperature of air blown into a passenger compartment by adjusting a ratio between an amount of air passing through a heating heat exchanger and an amount of air passing through a bypass passage through which air having passed through a cooling heat exchanger bypasses the heating heat exchanger. The temperature control unit includes a first door for adjusting an opening degree of the bypass passage, and a second door for adjusting an opening degree of an air inlet portion of the heating heat exchanger. The second door is a butterfly door having a rotation shaft at a center of the butterfly door in a door width direction, and the rotation shaft of the second door is disposed between the cooling heat exchanger and the heating heat exchanger. When a double-layer flow mode is set, the second door is rotated to fully open the air inlet portion while partitioning an air passage between the cooling heat exchanger and the heating heat exchanger into a first air passage through which outside air flows and a second air passage through which inside air flows. Thus, during the double-layer flow mode, outside air and inside air respectively flow into the heating heat exchanger through the first and second air passages defined by face and back surfaces of the second door. As a result, even when a rotation angle of the second door is set at a small angle from a maximum cooling position to a maximum heating position, a sufficient air-passing sectional area can be obtained at the maximum heating position. Accordingly, a distance between the cooling heat exchanger and the heating heat exchanger can be reduced, and a size of the air conditioner can be reduced.

Further, because the rotation angle of the second door can be set at a small angle smaller than 90°, the maximum heating position of the second door can be set at a rotation end position of the second door. Therefore, during the maximum heating, a top end of the second door can be made to be proximate to the cooling heat exchanger and the heating heat exchanger, and the partitioning performance of inside air and outside air between the cooling heat exchanger and the heating heat exchanger can be improved.

Preferably, the cooling heat exchanger and the heating heat exchanger are disposed to have a distance ($L_0$) therebetween at a position intersecting the rotation shaft of the second door, and the distance ($L_0$) is smaller than a width dimension ($L_2$) of the second door in the door width direction. Therefore, during the maximum heating, a sectional area of the air inlet portion of the heating heat exchanger can be increased due to the larger width dimension ($L_2$) of the second door, while the distance ($L_0$) between the cooling heat exchanger and the heating heat exchanger is decreased. Thus, the maximum heating capacity of the air conditioner can be increased with a small size of the air conditioner.

More preferably, when the first and second doors are moved from the maximum cooling toward the maximum heating, a door operation member for operatively linking the first and second doors is operated in such a manner that the second door is moved toward the maximum heating in precedent to the first door. Therefore, when the first and second doors are moved from the maximum cooling toward the maximum heating, an increased ratio of the opening degree of the air inlet portion of the heating heat exchanger due to the second door becomes larger than a decreased ratio of the bypass passage due to the first door. Thus, when operation of the air conditioner is moved from the maximum cooling to a temperature control area, a decreased ratio of cool air amount can be made smaller, and it can prevent warm air amount from being suddenly increased. As a result, the temperature of air blown from a face opening portion toward an upper side of a passenger in the passenger compartment can be smoothly controlled, and a pleasant feeling is given to the passenger.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings. In the embodiment, an air conditioner 1 shown in FIGS. 1, 2 is typically applied to a vehicle, and the air conditioner 1 is mounted on the vehicle so that a front-rear direction, a right-left direction and an up-down direction of the air conditioner 1 are placed to correspond to directions indicated in figures of the present invention.

The air conditioner 1 is disposed in an instrument panel on a vehicle front side of a passenger compartment at an approximate center in a vehicle right-left direction. An air blower (not shown) for blowing air into the air conditioner 1 is disposed at a side (e.g., front passenger's side) shifted from the air conditioner 1 in the vehicle right-left direction.

Figure 1:
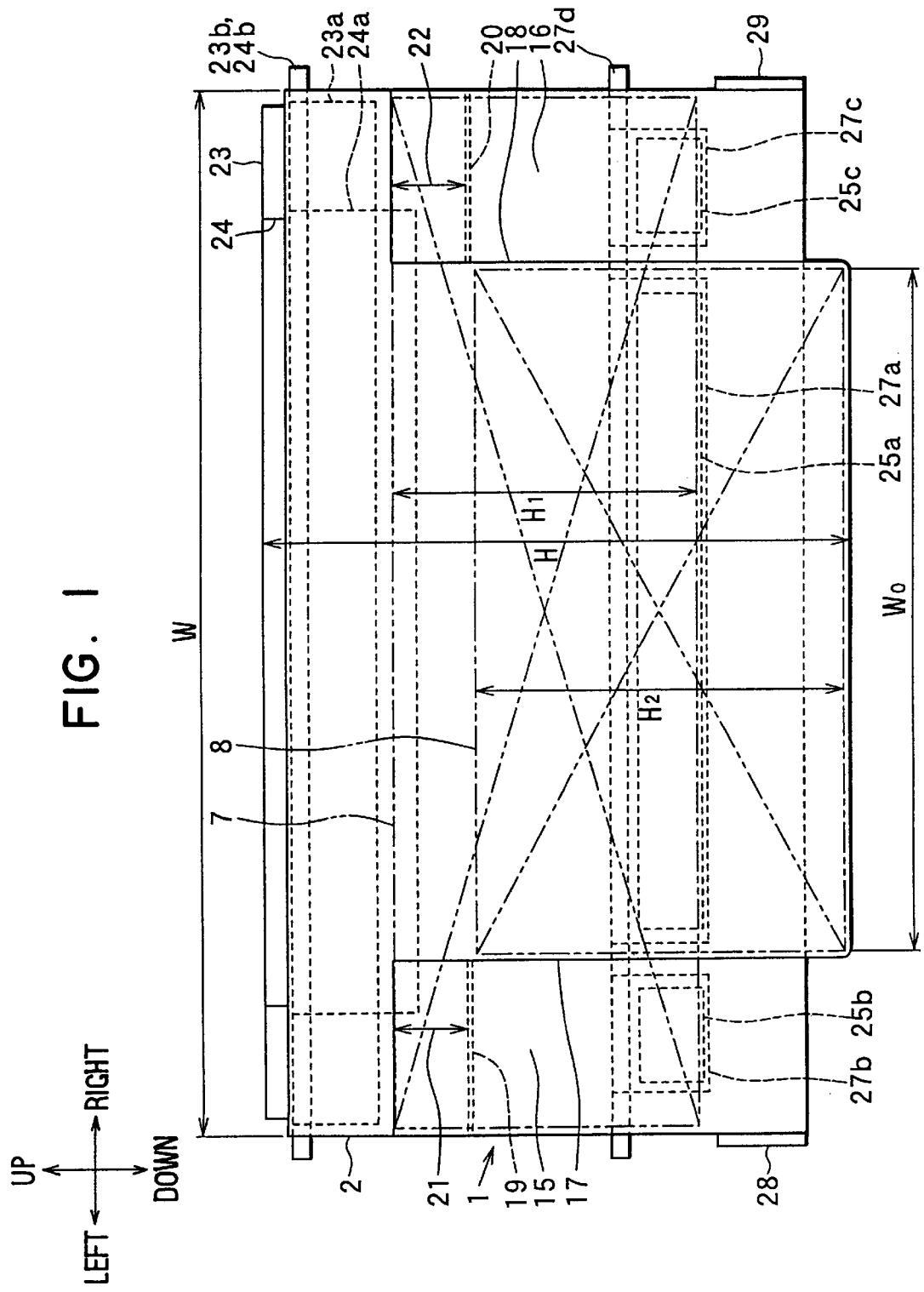
FIG. 1 is a schematic front view of a vehicle air conditioner according to a preferred embodiment of the present invention.
Figure 2:
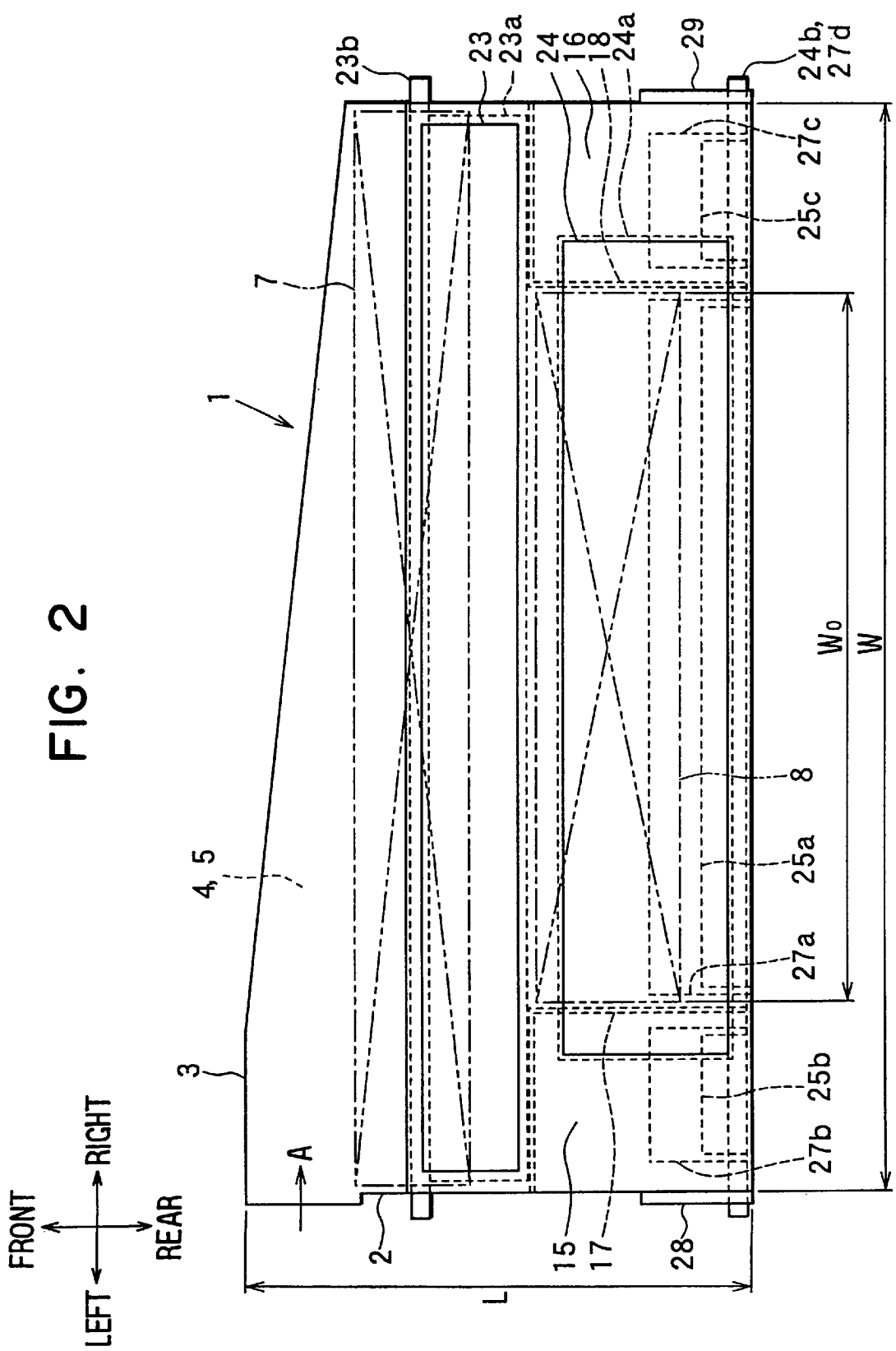
FIG. 2 is a schematic plan view of the air conditioner in FIG. 1.

As shown in FIGS. 1, 2, the air conditioner 1 has a dimension W in the vehicle right-left direction, a dimension L in a vehicle front-rear direction and a dimension H in a vehicle up-down direction. The dimension H of the air conditioner 1 is smaller than the dimension W of the air conditioner 1, so that the air conditioner 1 is formed into a lateral-longer flat shape. For example, the dimension W of the air conditioner 1 is 460 mm, the dimension L is 230 mm, and the dimension H is 250 mm.

The air conditioner 1 has an air conditioning case 2 made of resin, and the air conditioning case 2 includes a plurality of division cases. The division cases are integrally connected by a fastening unit, after various components are accommodated therein, to construct the air conditioning case 2 having the lateral-longer flat shape. The air conditioning case 2 forms therein an air passage through which air blown by the blower unit flows from a vehicle front side to a vehicle rear side.

Figure 3:
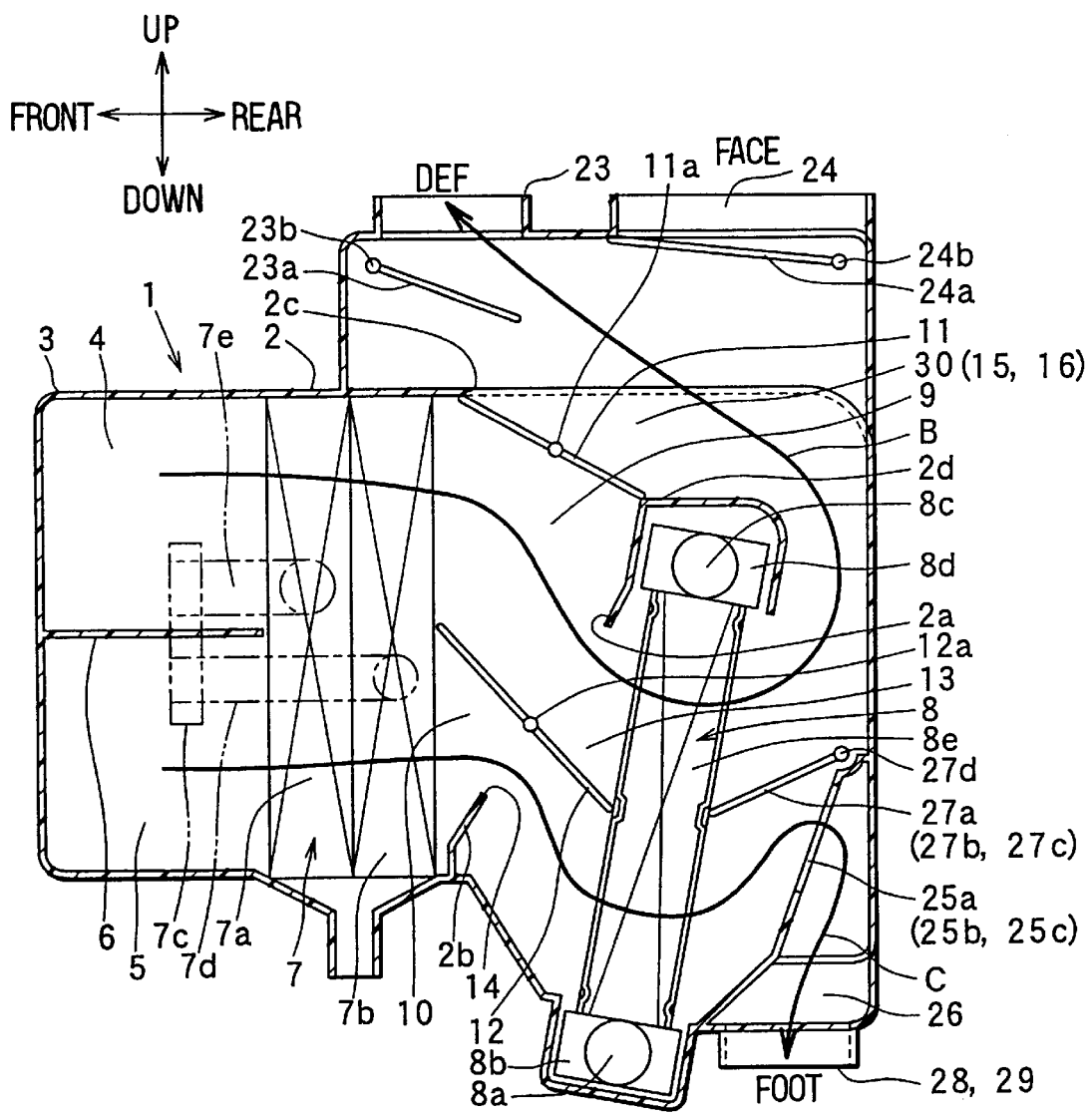
FIG. 3 is a schematic vertical sectional view of the air conditioner when a maximum heating is set during a foot mode according to the embodiment.

As shown in FIG. 2, an air inlet portion 3 from which air blown by the blower unit is introduced is formed in the air conditioner 1 at a most front side of the vehicle. In a vehicle having a right steering wheel, because the blower unit is disposed at a left side of the air conditioner 1, air flows into the air inlet portion 3 as shown by arrow A in FIG. 2. A first air passage 4 on a vehicle upper side and a second air passage 5 on a vehicle lower side are formed in the air inlet portion 3, as shown in FIG. 3, for example. The first and second air passages 4, 5 are partitioned from each other by a partition plate 6 formed integrally with the air conditioning case 2.

The blower unit includes an inside/outside air switching unit for selectively introducing outside air (i.e., air outside the passenger compartment) from an outside air suction port and inside air (i.e., air inside the passenger compartment) from an inside air suction port, and a blower for blowing the introduced air into the air conditioner 1. The blower has a first fan on an outside air side, and a second fan on an inside air side. During an inside/outside air double-layer flow mode (hereinafter referred to as "double-layer flow mode"), outside air and inside air can be simultaneously blown by the first fan and the second fan while being partitioned from each other. During the double-layer flow mode, outside air blown by the first fan flows into the first air passage 4 of the air inlet portion 3, and inside air blown by the second fan flows into the second air passage 5 of the air inlet portion 3.

Further, first and second air passages 9, 10 through which air from the air inlet portion 3 flows toward a vehicle rear side are formed as shown by arrows B and C in FIG. 3. An evaporator 7 is disposed in the air conditioning case 2 approximately vertically at an immediately downstream air side of the air inlet portion 3 to cross an entire area of the first and second air passages 9, 10.

In the embodiment of the present invention, the evaporator 7 has a dimension approximately equal to the dimension W of the air conditioning case 2 in the vehicle right-left direction, so that the evaporator 7 is formed into a lateral longer shape as shown in FIGS. 1, 2. As shown in FIG. 1, the evaporator 7 has a dimension H1 in a vehicle up-down direction. The evaporator 7 is a cooling heat exchanger which cools air by absorbing an evaporation latent heat of a refrigerant of a refrigerant cycle from air. The evaporator 7 is a laminated type in which a plurality of flat tubes are laminated to sandwich a corrugated fin between adjacent flat tubes, and then integrally brazed. Each of the flat tubes is formed by connecting two metal thin plates made of aluminum or the like to each other.

As shown in FIG. 3, the evaporator 7 is constructed by combining a first heat-exchanging portion 7a at an upstream air side and a second heat-exchanging portion 7b at a downstream air side. In the evaporator 7, refrigerant flows from an inlet pipe 7d of a pipe joint 7c into the second heat-exchanging portion 7b, passes through the first heat-exchanging portion 7a, and then flows into an outlet pipe 7e to be discharged.

Figure 4:
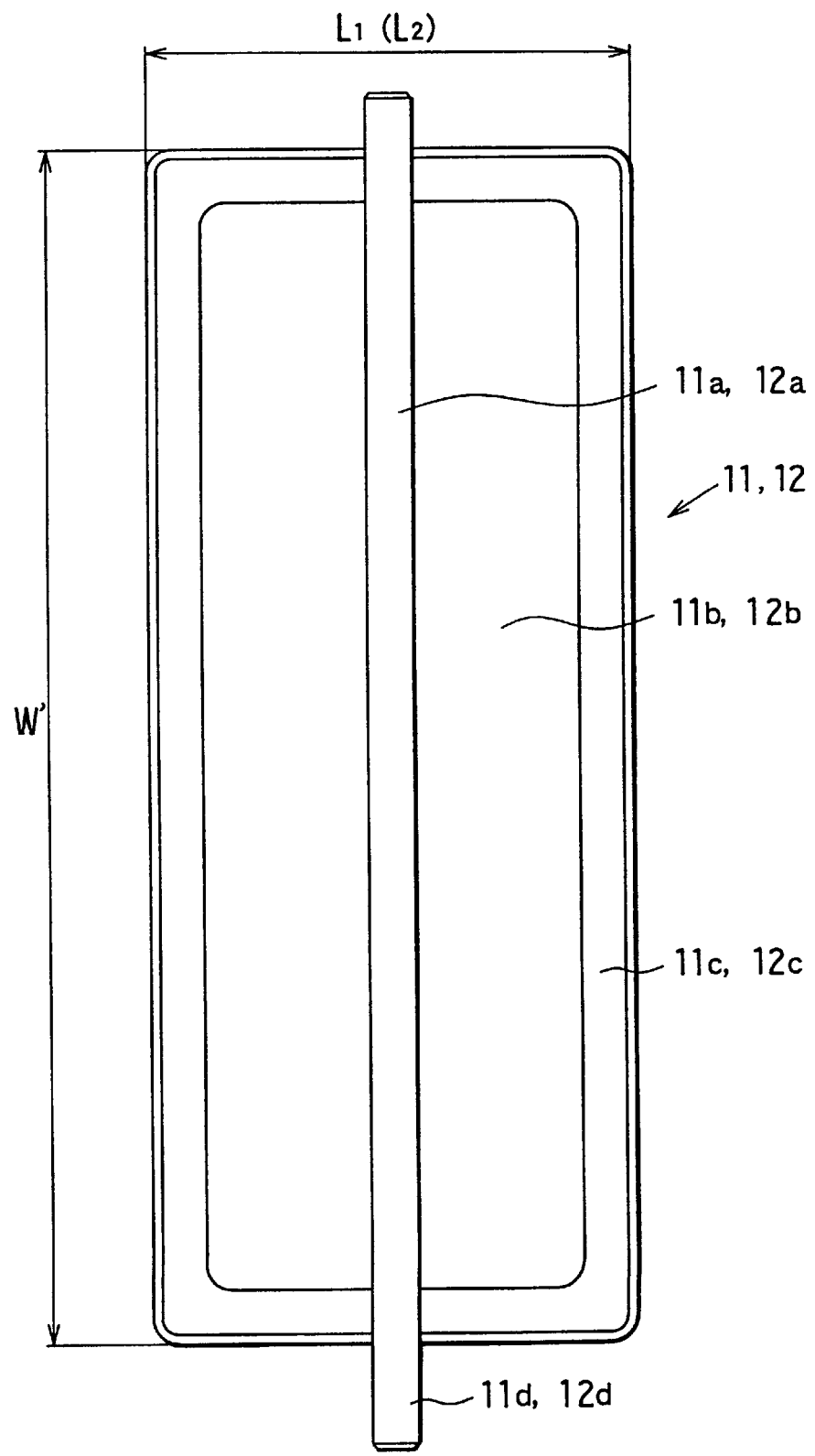
FIG. 4 is a front view of an air mixing door of the air conditioner according to the embodiment.

First and second air mixing doors 11, 12 are rotatably adjacently disposed at an immediately downstream air side (i.e., vehicle rear side) of the evaporator 7. Each of the first and second air mixing doors 11, 12 is a butterfly door having a rotation shaft 11a, 12a at a center portion in a door width direction as shown in FIG. 4. The first air mixing door 11 is disposed at an upper side of the second air mixing door 12. The first air mixing door 11 is rotated around the rotation shaft 11a in the vehicle up-down direction, and the second air mixing door 12 is rotated around the rotation shaft 12a in a vehicle front-rear direction.

Figure 5:
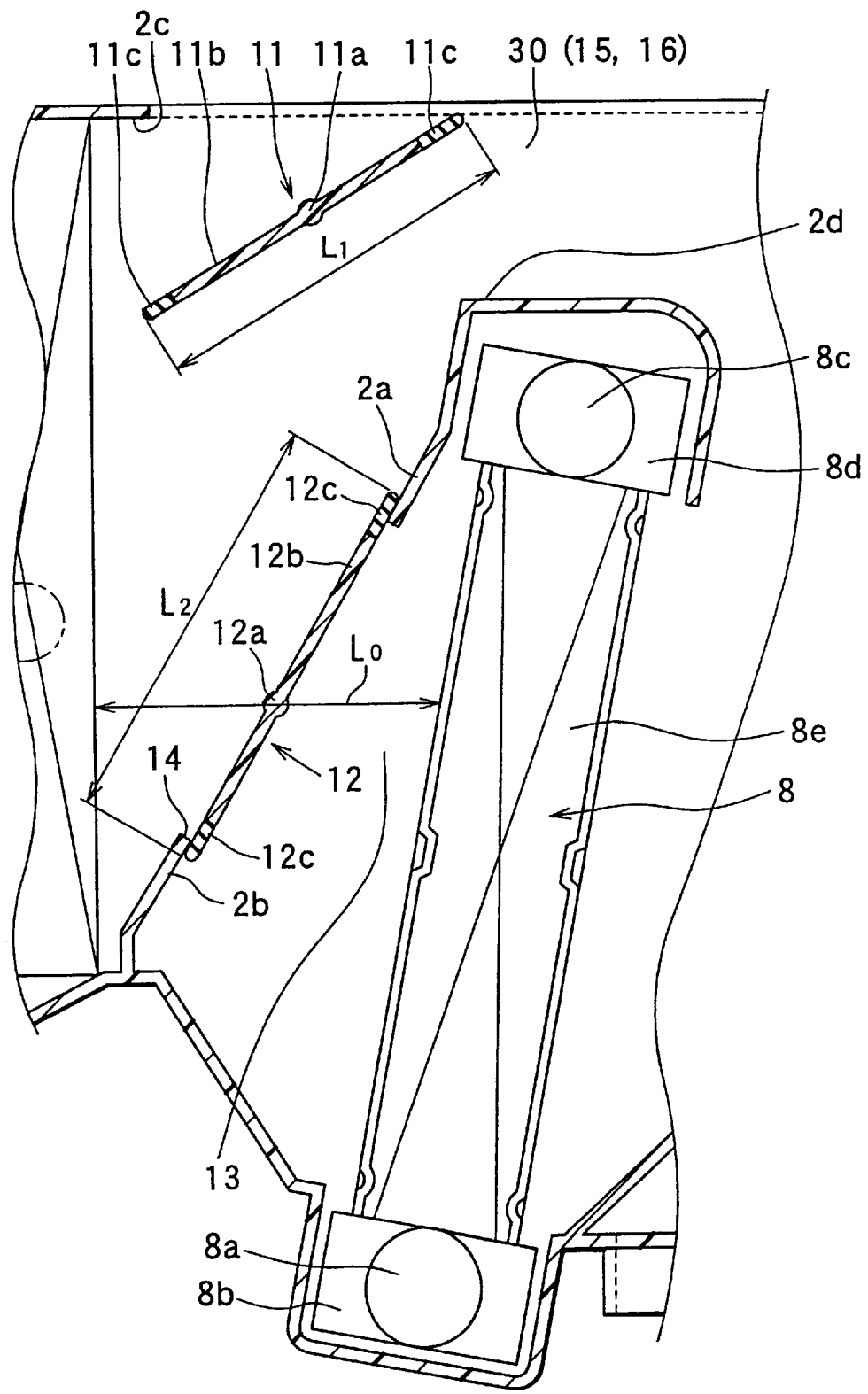
FIG. 5 is an enlarged sectional view showing a main portion of the air conditioner during a maximum cooling according to the embodiment.

FIG. 5 shows a main portion of the air conditioner 1 of the present invention in a maximum cooling. As shown in FIG. 5, the first air mixing door 11 has a door width dimension $L_1$ in the door width direction, and the second air mixing door 12 has a door width dimension $L_2$ in the door width direction. Each of the first and second air mixing doors 11, 12 has a dimension W' (FIG. 4) approximately equal to the dimension W of the air conditioning case 2 in the vehicle right-left direction.

The air mixing doors 11, 12 include the rotation shafts 11a, 12a made of resin such as polypropylene and nylon, door body portions 11b, 12b each having a rectangular shape, and seal members 11c, 12c made of elastic material such as rubber, respectively. The seal members 11c, 12c are disposed in the outer peripheral portions of the door body portions 11b, 12b, respectively. The rotation shaft 11a, the door body portion 11b and the seal member 11c may be integrally formed from a single die. Further, the rotation shaft 12a, the door body portion 12b and the seal member 12c may be integrally formed from a single die.

As shown in FIG. 5, the rotation shaft 12a of the second air mixing door 12 is disposed between the evaporator 7 and the heater core 8 at a center portion of an inlet opening portion 14 of a warm air passage 13 through which air passes through the heater core 8. During the maximum cooling, the seal member 12c of the second air mixing door 12 is elastically press-fitted to seal surfaces 2a, 2b provided on the air conditioning case 2, so that the inlet opening portion 14 of the warm air passage 13 is fully closed. When the second air mixing door 12 is rotated to the position shown in FIG. 3 during the maximum heating, the second air mixing door 12 fully opens the inlet opening portion 14 of the warm air passage 13. The second air mixing door 12 adjusts an opening degree of the inlet opening portion 14 so that an amount of air passing through the heater core 8 is adjusted. During the maximum heating, the seal portion 12c of the air mixing door 12 is placed at positions proximate to centers of the evaporator 7 and the heater core 8 in the up-down direction, so that the first air passage 9 and the second air passage 10 can be partitioned in the up-down direction between the evaporator 7 and the heater core 8 by the second air mixing door 12.

The first air mixing door 11 is disposed at an upper side of the heater core 8, and the rotation shaft 11a of the first air mixing door 11 is placed at a center portion of a defroster/face cool air passage 30 and foot cool air passages 15, 16 (i.e., bypass passage). Through the bypass passage, i.e., through the defroster/face cool air passage 30 and the foot cool air passages 15, 16, air having passed through the evaporator 7 bypasses the heater core 8. As shown in FIG. 5, during the maximum cooling, the first air mixing door 11 is rotated so that the defroster/face cool air passage 30 and the foot cool air passages 15, 16 are fully opened.

On the other hand, during the maximum heating as shown in FIG. 3, the seal member 11c of the first air mixing door 11 is elastically press-fitted to seal surfaces 2c, 2d of the air conditioning case 2 at an upper side of the heater core 8, so that the defroster/face cool air passage 30 and the foot cool air passages 15, 16 are fully closed. Therefore, the first air mixing door 11 adjusts opening degrees of the cool air passages 15, 16, 30.

The first and second air mixing doors 11, 12 are disposed so that the rotation shafts 11a, 12a are directed in the vehicle right-left direction. That is, each of the rotation shafts 11a, 12a of the first and second air mixing doors 11, 12 extends in the vehicle right-left direction. Both ends of each rotation shaft 11a, 12a are rotatably held in the air conditioning case 2. One end 11d, 12d of each rotation shaft 11a, 12a protrudes to the outer side of the air conditioning case 2, and is connected to a door operation member 40 shown in FIGS. 6, 7. The door operation member 40 includes a link member operatively connecting and rotating the first and second air mixing doors 11, 12, and an actuator (e.g., servomotor) 41 for driving the link member.

Figure 6:
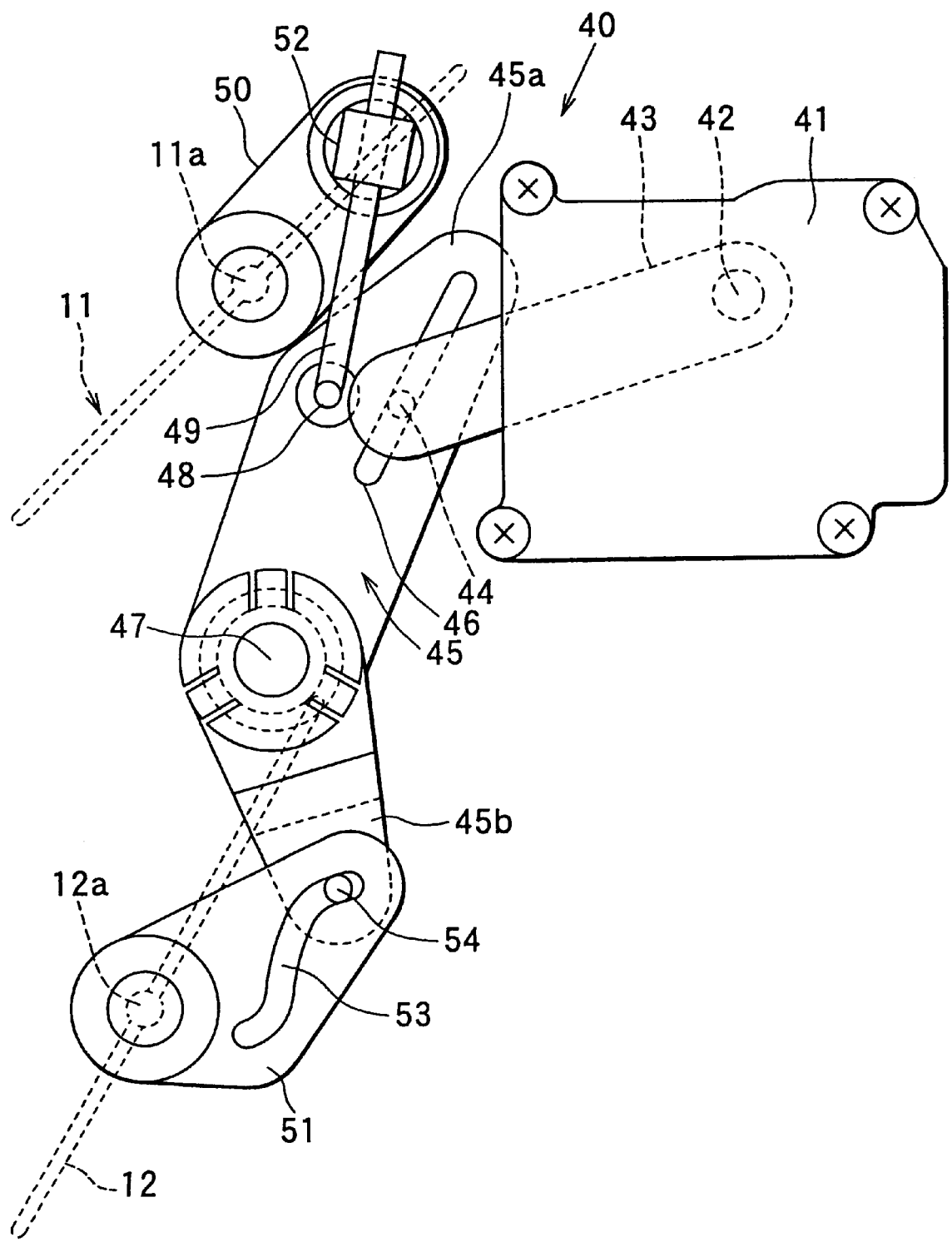
FIG. 6 is a view for explaining operation of a door operation member during a maximum cooling according to the embodiment.
Figure 7:
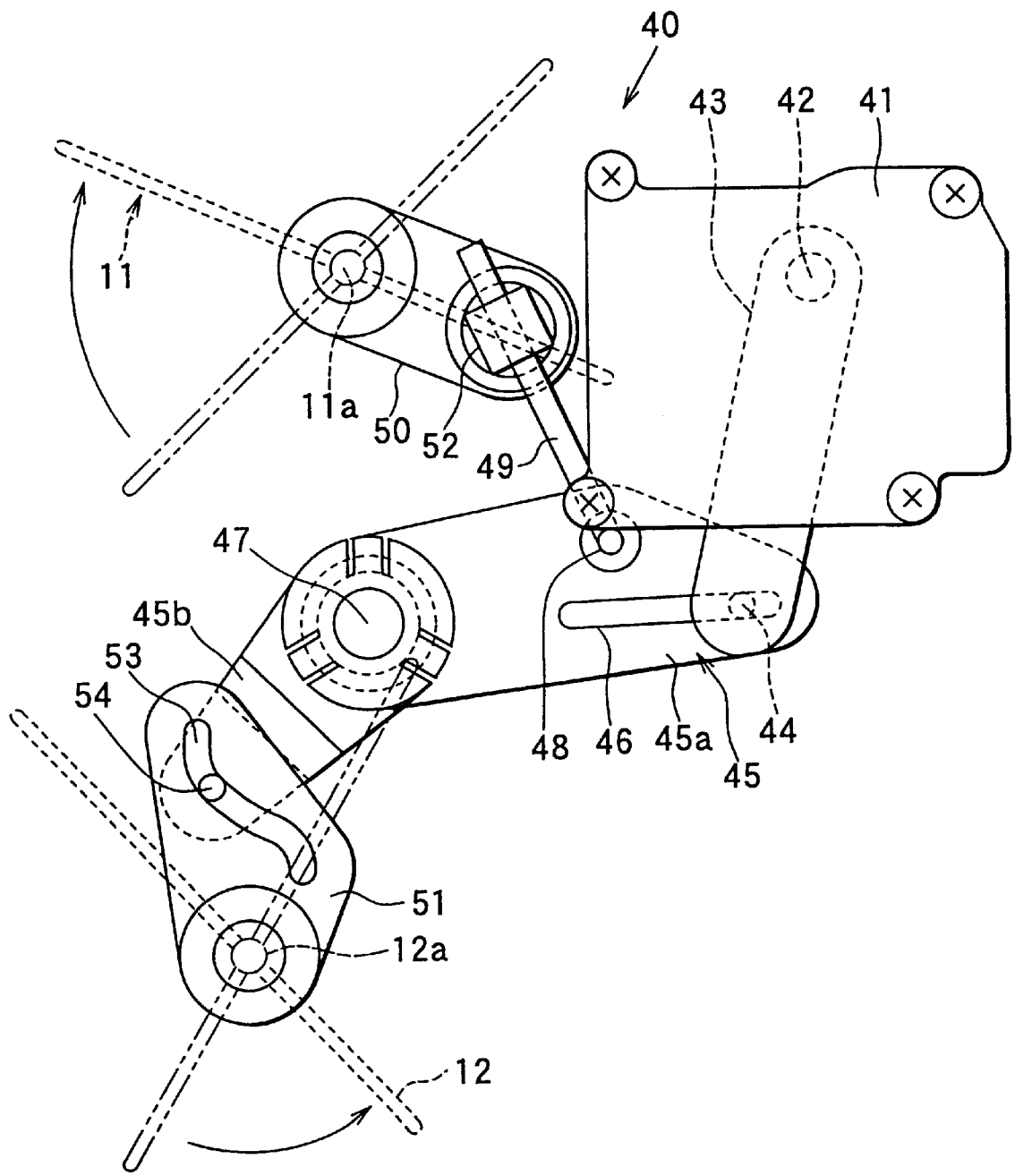
FIG. 7 is a view for explaining operation of the door operation member during the maximum heating according to the embodiment.

FIG. 6 shows an operation state of the door operation member 40 during the maximum cooling, and FIG. 7 shows an operation state of the door operation member 40 during the maximum heating. One end of the driving lever 43 is integrally connected to an output shaft 42 of the actuator 41, and a pin 44 is integrally connected to the other end of the driving lever 43. The pin 44 is slidably inserted into a thin long groove 46 of a driving link 45. The driving link 45 can be rotated around a supporting shaft 47, and is formed into a V shape to have a first driving piece 45a and a second driving piece 45b.

A round connection hole 48 is opened in a top end position of the first driving piece 45a, adjacent to the groove 46. A bent portion of an end portion of a connection rod 49 is rotatably inserted into the connection hole 48. On the other hand, one end of a lever 50 is connected to the end portion 11d of the rotation shaft 11a of the first air mixing door 11, and one end of a lever 51 is connected to the end portion 12d of the rotation shaft 12a of the second air mixing door 12. A rod holding member 52 is rotatably held in a connection hole provided in other end of the lever 50, and the other end of the connection rod 49 is inserted into an insertion hole provided in the rod holding member 52, so that the other end of the lever 50 is rotatably connected to the other end of the connection rod 49.

Further, a groove 53 approximately having a S-shape is formed in the lever 51, and a pin 54 provided at a top end side of the second driving piece 45b of the driving link 45 is slidably held in the groove 53.

When the driving lever 43 is rotated from the position shown in FIG. 6 to the position shown in FIG. 7 by the rotation of the output shaft 42 of the actuator 41, the driving link 45 and the levers 50, 51 are also rotated to the position shown in FIG. 7. As a result, the first air mixing door 11 is rotated clockwise from the position of FIG. 6 to the position of FIG. 7, and the second air mixing door 12 is rotated counterclockwise from the position of FIG. 6 to the position of FIG. 7. That is, the door operation member 40 is constructed so that the first and second air mixing doors 11, 12 are rotated in the reverse direction from each other.

Figure 8:
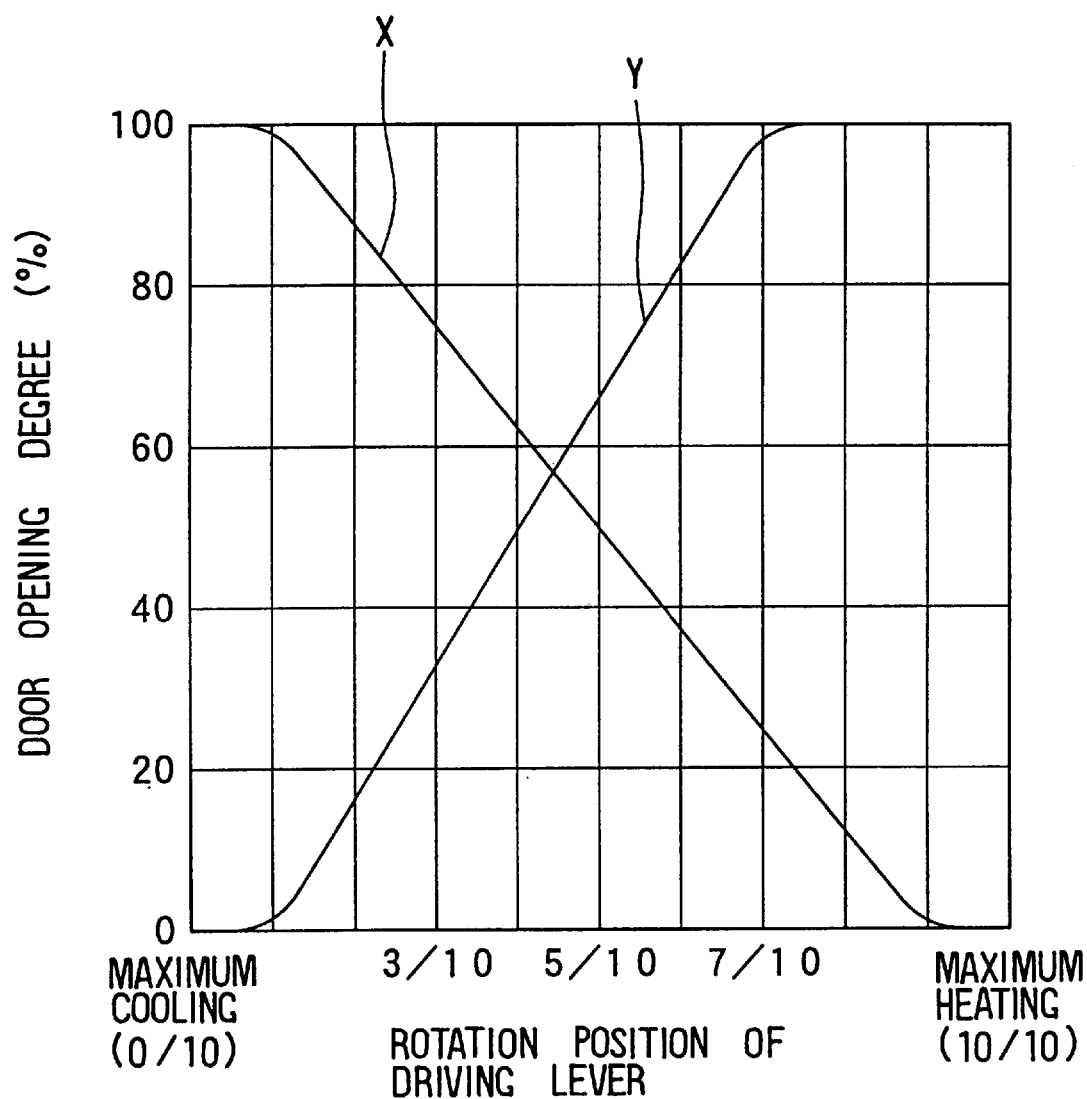
FIG. 8 is a graph showing the relationship between an opening degree of the air mixing door and a rotation position of a driving lever, according to the embodiment.

FIG. 8 shows the relationship between the rotation position of the driving lever 43, and the opening degrees of the first and second air mixing doors 11, 12. In FIG. 8, graph X shows the opening degree of the first air mixing door 11, and graph Y shows the opening degree of the second air mixing door 12. The rotation position of the driving lever 43 during the maximum cooling is set at 0/10, and the rotation position of the driving lever 43 during the maximum heating is set at 10/10. As shown in FIG. 8, when first and second air mixing doors 11, 12 are rotated from the maximum cooling position shown in FIG. 6 to the maximum heating position shown in FIG. 7, the door operation member 40 can be set so that the second air mixing door 12 is rotated in precedent relative to the first air mixing door 11.

As shown in FIG. 3, the heater core 8 is disposed approximately vertically at an immediately downstream air side (i.e., vehicle rear side) of the first and second air mixing doors 11, 12 to be shifted to a lower side relative to the evaporator 7 so that the bypass passage (i.e., cool air passages 30, 15, 16) is formed at an upper side of the heater core 8. As shown in FIGS. 1, 2, the heater core 8 has a dimension $W_0$ in the vehicle right-left direction smaller than the dimension W of the evaporator 7, and a dimension $H_2$ in the vehicle up-down direction. In the embodiment of the present invention, the dimension $W_0$ of the heater core 8 is approximately equal to 70% of the dimension W of the evaporator 7 (i.e., $W_0 = 0.7W$).

The heater core 8 heats air having passed through the evaporator 7 by using cooling water (hot water) for cooling an engine as a heating source. Similarly to the evaporator 7, the heater core 8 is formed into a lateral-longer shape having the longest dimension $W_0$ in the vehicle right-left direction.

The heater core 8 includes an inlet tank 8b, an outlet tank 8d, and a heat-exchanging portion 8e between the inlet tank 8b and the outlet tank 8d. The inlet tank 8b has an inlet pipe 8a through which hot water flows into the heater core 8, and the outlet tank 8d has an outlet pipe 8c through which hot water having being heat-exchanged is discharged. The inlet tank 8b of the heater core 8 is disposed at a lower side of the heat-exchanging portion 8e, and the outlet tank 8d thereof is disposed at an upper side of the heat-exchanging portion 8e. The heat-exchanging portion 8e is a laminated type in which a plurality of flat tubes, each of which is formed by connecting two metal plates made of aluminum or the like to each other, are laminated to sandwich a corrugated fin between the adjacent flat tubes, and then integrally brazed. In the embodiment of the present invention, the heater core 8 is a one-way flow type in which hot water from the inlet tank 8b flows upwardly through the entire flat tubes of the heat-exchanging portion 8e toward the outlet tank 8d in one way.

Figure 9:
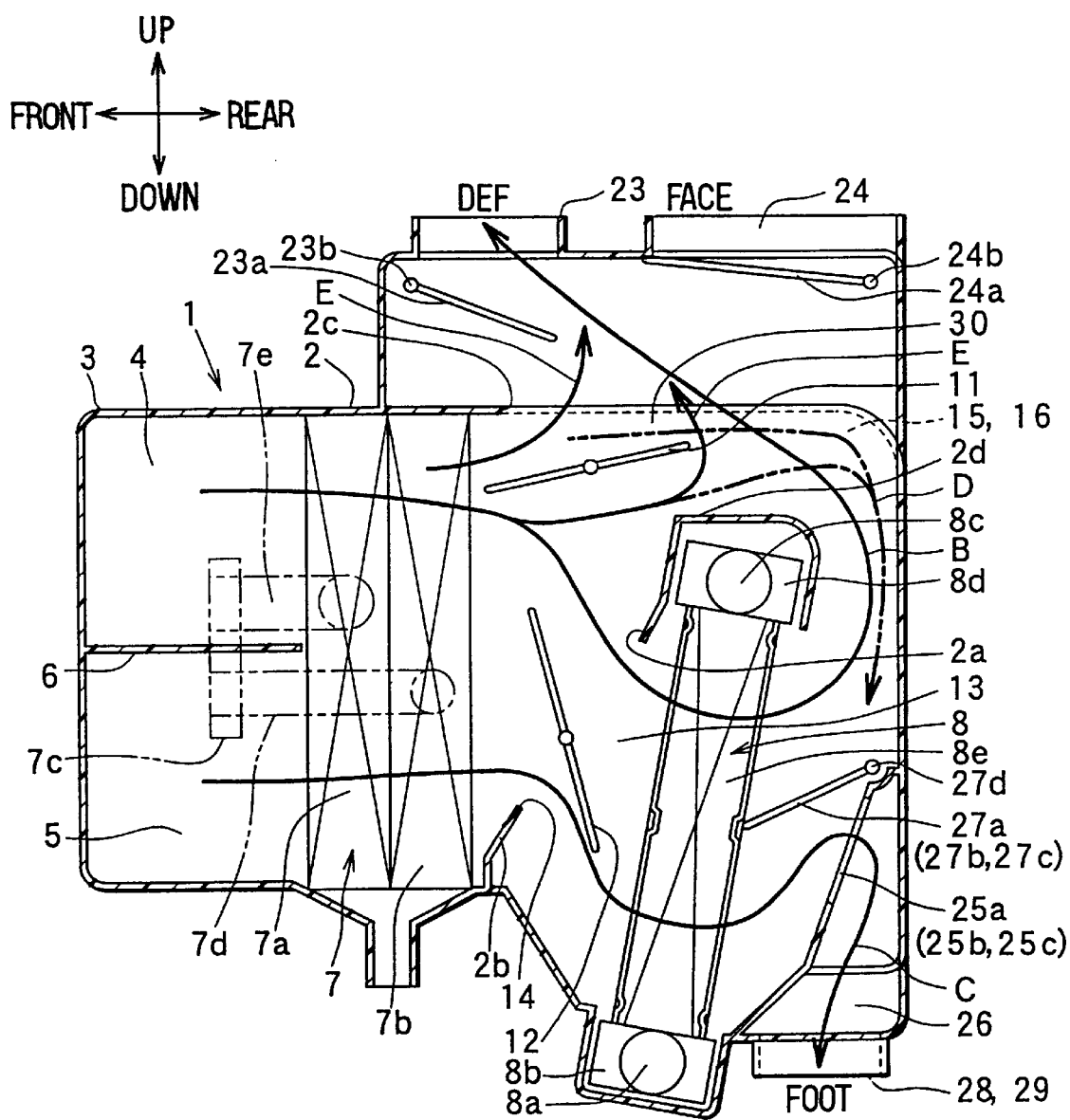
FIG. 9 is a schematic vertical sectional view of the air conditioner when a temperature control area is set during the foot mode according to the embodiment.

FIG. 9 shows the air conditioner 1 when a temperature control area is set during the foot mode. During the temperature control area of the foot mode, temperature of air blown into the passenger compartment is controlled by mixing warm air and cool air. In this case, as shown by arrow B and C of FIG. 9, the warm air passage 13 through which air passes through the heater core 8 is formed in a range of the dimension $W_0$ of the heater core 8 in the vehicle right-left direction. As shown in FIGS. 1, 2, at both sides of the heater core 8 in the vehicle right-left direction, there is formed the foot cool air passages 15, 16 through which air having passed through the evaporator 7 bypasses the heater core 8 and is directly introduced into a foot opening portion. Further, partition plates 17, 18 are disposed on both sides of the heater core 8 in the vehicle right-left direction. Therefore, the foot cool air passages 15, 16 are partitioned from the warm air passage 13 by the partition plates 17, 18 in the vehicle right-left direction.

Further, as shown in FIG. 1, partition plates 19, 20 protruding from the bottom of the air conditioning case 2 to an approximate upper end of the heater core 8 are disposed between the partition plates 17, 18 and both side walls of the air conditioning case 2 in the vehicle right-left direction. By the partition plates 19, 20, cool air inlet ports 21, 22 for introducing cool air immediately after the evaporator 7 are formed on both sides of the evaporator 7 at an upper position. In FIG. 1, the arrow ranges of the cool air inlet ports 21, 22 indicate forming areas of the cool air inlet ports 21, 22 in the up-down direction. The partition plates 19, 20 are formed at a vehicle rear side of the air mixing doors 11, 12 so that the rotations of the air mixing doors 11, 12 are not affected by the partition plates 19, 20.

In FIG. 9, the chain line arrow D indicates a cool air flow due to the foot cool air passages 15, 16. As shown by the chain line arrow D in FIG. 9, the foot cool air passages 15, 16 are formed in such a manner that air introduced from the cool air inlet ports 21, 22 immediately after the evaporator 7 is lead toward a lower side of the heater core 8 after passing through upper side of the heater core 8 on both right and left sides.

Figure 12:
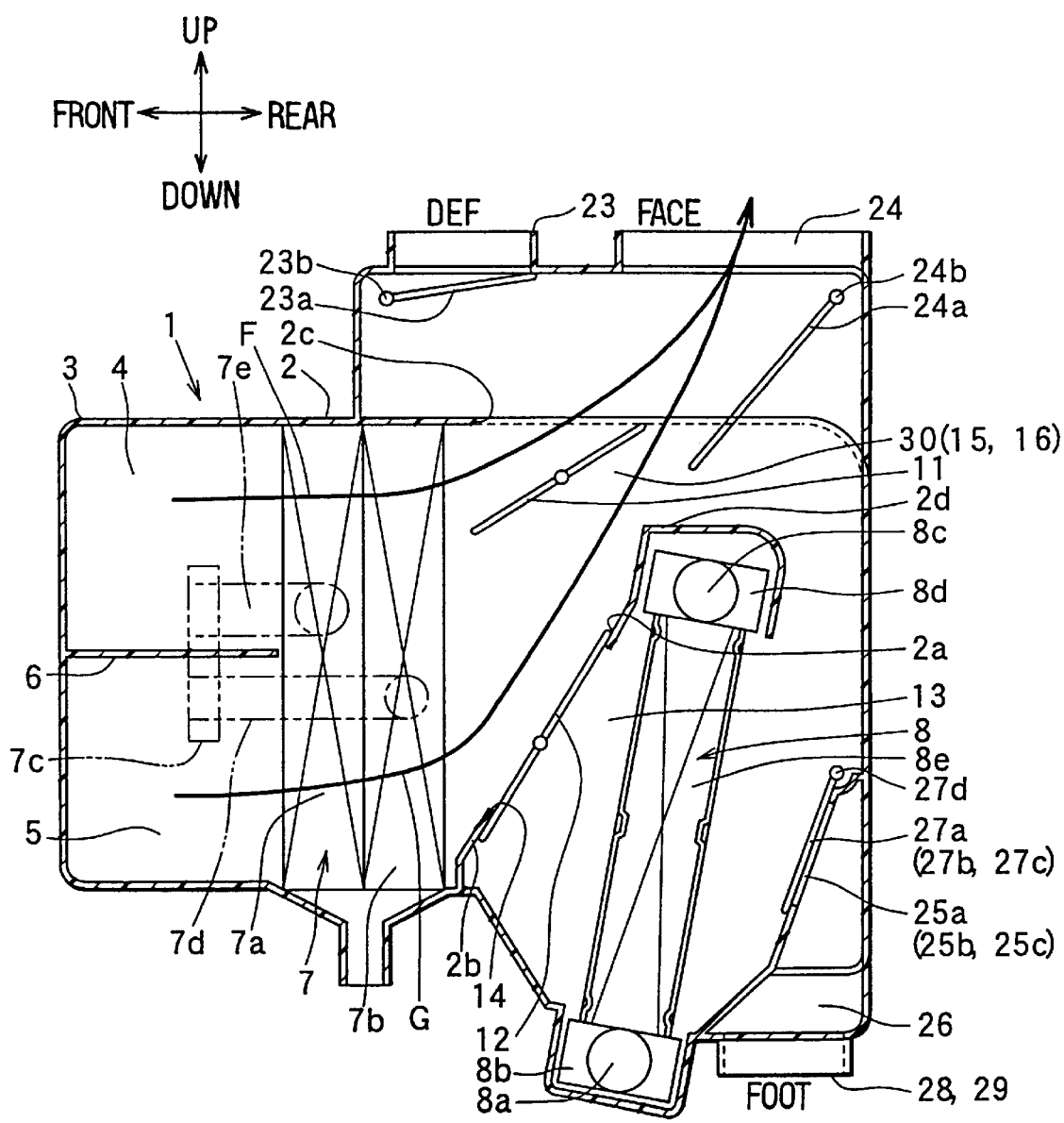
FIG. 12 is a schematic vertical sectional view of the air conditioner when the maximum cooling is set during a face mode according to the embodiment.

On the other hand, the defroster/face cool air passage 30 through which cool air flows from a position immediately after the evaporator 7 toward a defroster opening portion 23 and a face opening portion 24 are formed independently with the foot cool air passages 15, 16, as shown by arrow E in FIG. 9 and by arrow F, G in FIG. 12. Because the defroster/face cool air passage 30 and the foot cool air passages 15, 16 are provided above the heater core 8, the opening degree of the defroster/face cool air passage 30 and the opening degrees of the cool air inlet ports 21, 22 of the foot cool air passages 15, 16 can be adjusted by the first air mixing door 11 provided at an upper side within the air conditioning case 2. Further, the opening degree of the warm air passage 13 can be adjusted by the second air mixing door 12 provided at a lower side of the first air mixing door 11.

Next, an air outlet mode switching mechanism of the air conditioner 1 according to the embodiment will be now described. As shown in FIGS. 2, 3, the defroster opening portion 23 is formed on an upper wall portion of the air conditioning case 2 at an approximate center position in the vehicle front-rear direction to be opened within the air conditioning case 2. The defroster opening portion 23 is connected to a defroster duct (not shown), so that conditioned air is blown toward an inner surface of a windshield of the vehicle from a defroster air outlet provided at a top end of the defroster duct. The defroster opening portion 23 is opened and closed by a plate-like defroster door 23a which can be rotated around a rotation shaft 23b.

The face opening portion 24 is for blowing air toward the upper area of a passenger in the passenger compartment. The face opening portion 24 is provided in the upper wall portion of the air conditioning case 2 on a vehicle rear side of the defroster opening portion 23. The face opening portion 24 is connected to a face duct (not shown), and conditioned air is blown toward the upper area of the passenger in the passenger compartment from a face air outlet provided at a top end of the face duct. The face opening portion 24 is opened and closed by a plate-like face door 24a rotated around a rotation shaft 24b.

Foot opening portions 25a, 25b, 25c for blowing air toward the foot area of the passenger compartment of the vehicle are provided on the bottom wall surface of the air conditioning case 2 at a most vehicle rear side. The foot opening portions 25a, 25b, 25c are opened and closed by foot doors 27a, 27b, 27c, respectively. Each of the foot doors 27a, 27b, 27c is a plate-like door, and is connected to a single rotation shaft 27d. Therefore, the three foot doors 27a, 27b, 27c are rotated by the single rotation shaft 27d. As shown in FIGS. 1, 2, the foot opening portion (i.e., center foot opening portion) 25a is provided at a center position of the air conditioning case 2 in the vehicle right-left direction. Warm air from the warm air passage 13, having passed through the heater core 8, flows into an air mixing chamber 26 (see FIG. 3) through the center foot opening portion 25a. The foot opening portions 25b, 25c are provided at both sides of the center foot opening portion 25a in the air conditioning case 2 to correspond to the foot cool air passages 15, 16, so that cool air from the foot cool air passages 15, 16 flows into the air mixing chamber 26 through the foot opening portions 25b, 25c.

As shown in FIG. 3, the foot door 27a is rotated to open the foot opening portion 25a during the foot mode. In this case, a top end of the foot door 27a is placed at an approximate center position of the heat-exchanging portion 8e of the heater core 8 in the up-down direction, so that a downstream air passage of the heater core 8 is also partitioned into the first air passage 9 and the second air passage 10.

The rotation shaft 23b of the defroster door 23a, the rotation shaft 24b of the face door 24a and the rotation shaft 27d of the foot doors 27a, 27b, 27c are connected to an actuator (e.g., a single servomotor or plural servomotors) through a link mechanism, so that the doors 23a, 24a, 27a, 27b, 27c are driven by the actuator through the link mechanism.

The air mixing chamber 26 shown in FIG. 3 is a single communication space communicating in the vehicle right-left direction. Therefore, warm air from the foot opening portion 25a and cool air from the foot opening portions 25b, 25c at both sides of the foot opening portion 25a are mixed in the air mixing chamber 26. Foot air outlets 28, 29 for blowing air toward the foot area of the passenger in the passenger compartment are opened in the air mixing chamber 26 at both sides in the vehicle right-left direction.

Next, mode operation of the air conditioner according to the embodiment of the present invention will be now described.

(1) FOOT MODE

FIG. 3 shows a state of the air conditioner 1 when the maximum heating is set during the foot mode. When the maximum heating is set during the foot mode, the face opening portion 24 is fully closed by the face door 24a, and the defroster opening portion 23 is opened by the defroster door 23a with a small opening degree. Further, the foot opening portions 25a, 25b, 25c are fully opened by the foot doors 27a, 27b, 27c, respectively.

During the maximum heating, the double-layer flow mode is set. That is, the first and second air mixing doors 11, 12 are rotated at the positions shown in FIG. 3. At this time, the seal member 11c of the first air mixing door 11 is elastically press-fitted to the seal surfaces 2c, 2d of the air conditioning case 2, so that the defroster/face cool air passage 30 and the foot cool air passages 15, 16 are fully closed. On the other hand, because the second air mixing door 12 fully opens the inlet opening portion 14 of the warm air passage 13, air flows through the heat-exchanging portion 8e of the heater core 8 with the maximum flow amount. In this case, the second air mixing door 12 and the foot door 27a are used as the partition member for partitioning the first air passage 9 through which outside air flows and the second air passage 10 through which inside air flows.

Further, during the maximum heating, the inside/outside air double-layer flow mode is set so that inside air and outside air are respectively sucked by the blower unit. Therefore, by the operation of the first and second fans of the blower unit, outside air flows into the first air passage 4 of the air inlet portion 3, and inside air flows into the second air passage 5 of the air inlet portion 3. Outside air introduced into the first air passage 4 passes through the evaporator 7, and flows into an upper portion of the heat-exchanging portion 8e of the heater core 8 after passing through the first air passage 9 between the first and second air mixing doors 11, 12. Therefore, outside air flowing into the heater core 8 is heat-exchanged with hot water to be heated. On the other hand, inside air of the second air passage 5 passes through the evaporator 7, and flows into the lower portion of the heat-exchanging portion 8e of the heater core 8 after passing through the second air passage 10 at the lower side of the second air mixing door 12. Therefore, inside air flowing into the heater core 8 is heat-exchanged with hot water to be heated.

In this case, because the first and second air passages 9, 10 are also partitioned at the downstream air side of the heater core 8 by the foot door 27a, outside air having been heated flows upwardly as shown by arrow B in FIG. 3 toward the defroster opening portion 23, and is blown toward the inner surface of the windshield from the defroster air outlet so that the windshield is defrosted. On the other hand, inside air having been heated passes the foot opening portion 25a and flows downwardly so that a flow direction of air is changed downwardly. Inside air having passed through the foot opening portion 25a passes through the air mixing chamber 26, and flows toward the foot air outlets 28, 29. Therefore, pressure loss of the inside air flow can be reduced, and an amount of inside air flowing into the foot air outlets 28, 29 can be increased. Thus, during the double-layer flow mode, both of heating effect of the foot area of the passenger and defrosting effect of the windshield can be improved.

When the driving lever 43 is rotated to the position 5/10 in FIG. 8 and the temperature control area is set during the foot mode, the first and second air mixing doors 11, 12 are rotated to an intermediate position between the maximum heating position and the cooling mode position, as shown in FIG. 9. With the rotations of the first and second air mixing doors 11, 12, the defroster/face cool air passage 30 and the foot cool air passages 15, 16 are opened with predetermined opening degrees, and the inlet opening portion 14 of the warm air passage 13 is opened with a predetermined opening degree smaller than the maximum opening degree.

As a result, warm air having passed through the lower portion of the heat-exchanging portion 8e of the heater core 8 flows into the air mixing chamber 26 after passing through the foot opening portion 25a. Simultaneously, cool air immediately after passing through the evaporator 7 flows into the foot cool air passages 15, 16 from the cool air inlet ports 21, 22 provided on both right and left sides of the evaporator 7 at an upper side. Therefore, as shown by arrow D in FIG. 9, the cool air passes above the heater core 8 on both right and left sides of the heater core 8, and flows downwardly. Thereafter, the cool air flows into the air mixing chamber 26 after passing through the foot opening portions 25b, 25c opened by the foot doors 27b, 27c. Thus, within the air mixing chamber 26, warm air from the center foot opening portion 25a and cool air from the right and left side foot opening portions 25b, 25c are mixed, so that conditioned warm air having a predetermined temperature is obtained and is blown toward the foot area of a passenger seated on a front seat in the passenger compartment from the foot air outlets 28, 29 provided at both right and left sides of the air conditioning case 2.

Further, warm air having passed through the upper side portion of the heat-exchanging portion 8e of the heater core 8 flows toward the defroster opening portion 23 as shown by arrow B in FIG. 9, while a part of cool air immediately after the evaporator 7 flows toward the defroster opening portion 23 through the defroster/face cool air passage 30 as shown by arrow E in FIG. 9. Thus, warm air and cool air are mixed in an inlet side of the defroster opening portion 23 to have a predetermined temperature, and the mixed air is blown toward the inner surface of the windshield from the defroster opening portion 23 so that the windshield is defrosted.

When the temperature control area is set during the foot mode, the temperature of air blown toward the lower side of the passenger compartment and the windshield can be arbitrarily adjusted by adjusting the rotation positions of the first and second air mixing doors 11, 12. Further, during the temperature control area of the foot mode, the foot cool air passages 15, 16 and the warm air passage 13 are formed approximately linearly in the vehicle front-rear direction, and are bent simply downwardly. Therefore, pressure loss of air flow can be reduced so that the amount of air blown toward the lower side of the passenger compartment can be improved.

During the temperature control area of the foot mode, an entire outside air mode is generally set so that only outside air is introduced into the first air passage 4, 9 and the second air passage 5, 10.

(2) FOOT/DEFROSTER MODE

Figure 10:
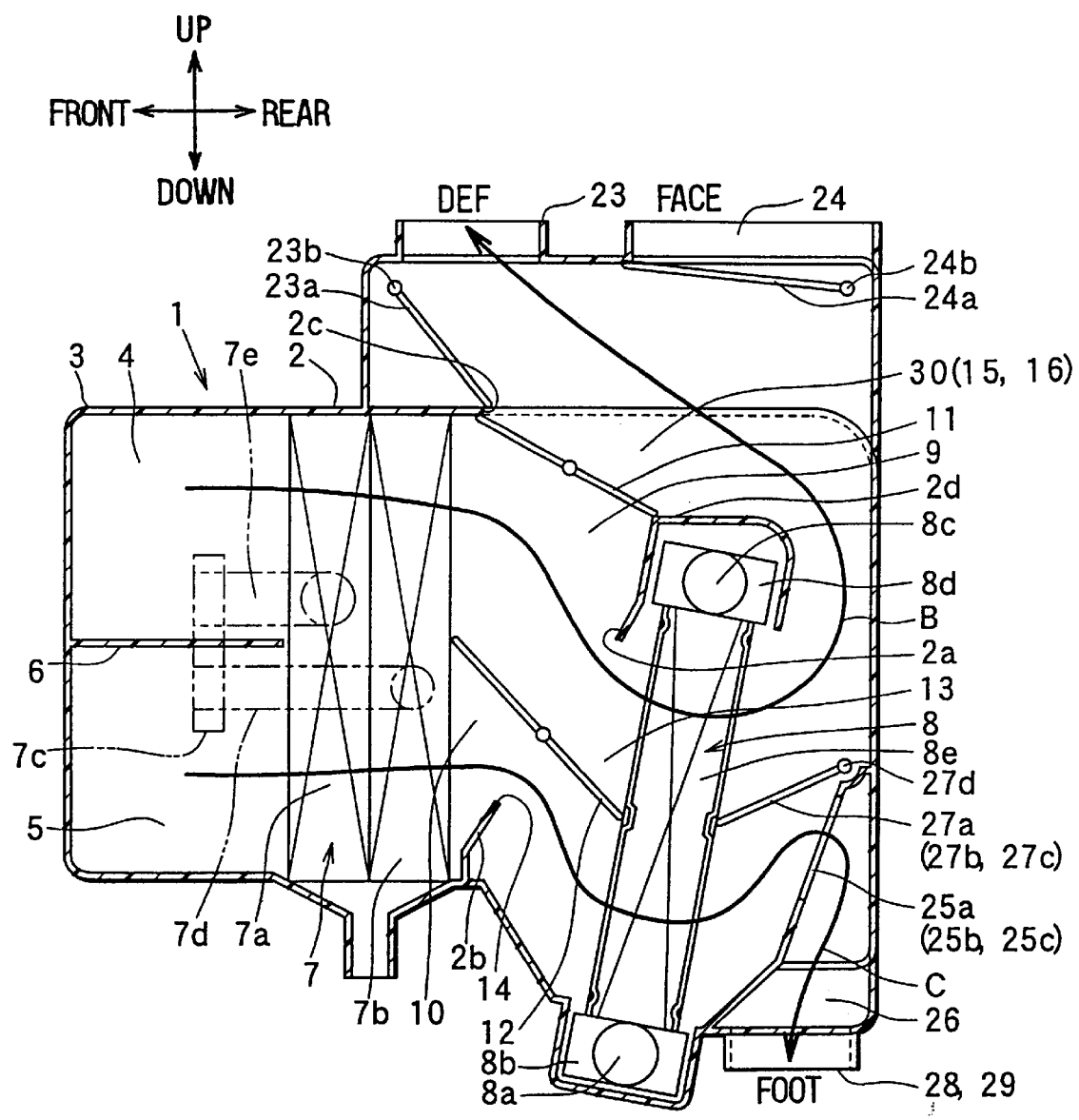
FIG. 10 is a schematic vertical sectional view of the air conditioner when the maximum heating is set during a foot/defroster mode according to the embodiment.

FIG. 10 shows a maximum heating during the foot/ defroster mode. In the maximum heating of the foot/ defroster mode, the defroster door 23a fully opens the defroster opening portion 23 so that the amount of air blown from the defroster opening portion 23 is increased. That is, during the foot mode, a ratio of the air amount toward the foot opening side to the air amount toward the defroster opening side is set to approximately 8/2. However, during the foot/defroster mode, the ratio of the air amount toward the foot opening side to the air amount toward the defroster opening side is set to approximately 5/5. During the foot/ defroster mode, the other portions are similar to the foot mode, and the explanation thereof is omitted.

(3) DEFROSTER MODE

Figure 11:
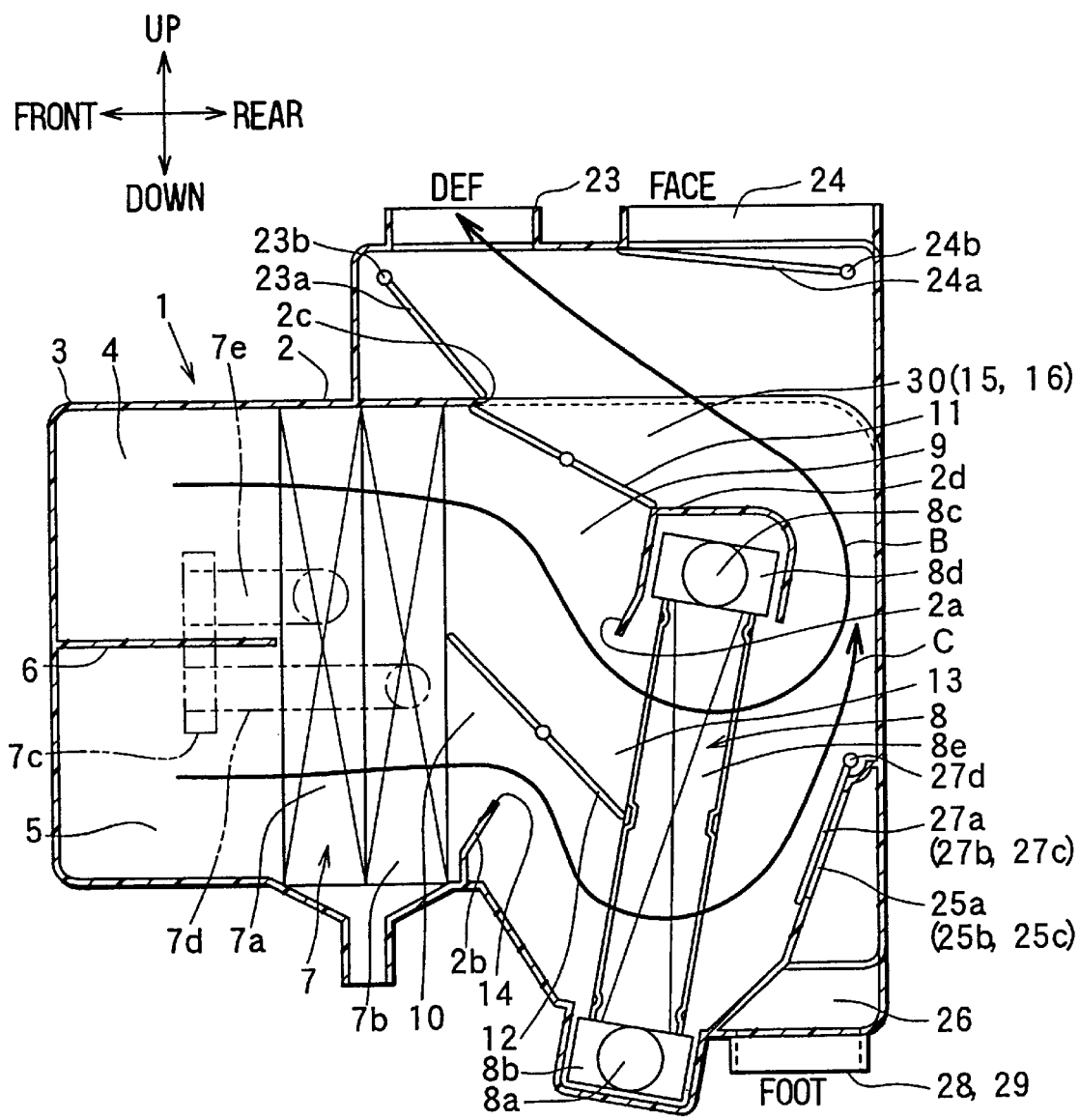
FIG. 11 is a schematic vertical sectional view of the air conditioner when the maximum heating is set during a defroster mode according to the embodiment.

FIG. 11 shows a maximum heating during the defroster mode. During the defroster mode, the face opening portion 24 is fully closed by the face door 24a, and the three foot opening portions 25a, 25b, 25c are fully closed by the foot doors 27a, 27b, 27c, respectively. On the other hand, the defroster opening portion 23 is fully opened by the defroster door 23a. Further, when the maximum heating is set during the defroster mode, warm air having passed through the upper and lower portions of the heat-exchanging portion 8e of the heater core 8 flows toward the defroster opening portion 23, as shown by arrows B, C in FIG. 11. Therefore, entire warm air having passed through the heater core 8 flows into the defroster opening portion 23, and is blown toward the inner surface of the windshield from the defroster air outlet so that the windshield is defrosted. When a temperature control area is set during the defroster mode, the rotation positions of the first and second air mixing doors 11, 12 are adjusted similarly to the temperature control area of the foot mode so that a ratio of the amount of cool air from the defroster/face cool air passage 30 to the amount of warm air passing through the heater core 8 is adjusted. Therefore, during the temperature control area of the defroster mode, the temperature of air blown toward the windshield can be arbitrarily controlled. During the defroster mode, the entire outside air mode is generally set so that defrosting performance of the windshield can be sufficiently improved.

(4) FACE MODE

FIG. 12 shows the maximum cooling during the face mode. During the face mode, the defroster opening portion 23 is fully closed by the defroster door 23a, and the three foot opening portions 25a, 25b, 25c are fully closed by the foot doors 27a, 27b, 27c, respectively. On the other hand, the face opening portion 24 is fully opened by the face door 24a. In the maximum cooling of the face mode, both of the first and second air mixing doors 11, 12 are rotated to the rotation position shown in FIG. 12, so that the foot/defroster cool air passage 30 and the foot cool air passages 15, 16 are fully opened and the inlet opening portion 14 of the warm air passage 13 is fully closed by the second air mixing door 12. Therefore, air bypasses the heat-exchanging portion 8e of the heater core 8. In this case, even when the foot cool air passages 15, 16 are fully opened, the foot opening portions 25b, 25c are fully closed. Therefore, cool air does not flow through the foot cool air passages 15, 16.

With the operation of a refrigerant cycle of the air conditioner 1, air is cooled in the evaporator 7, and flows toward the face opening 24 after passing through the defroster/face cool air passage 30 as shown by arrows F, G in FIG. 12. Thus, cool air is blown toward the upper area of the passenger in the passenger compartment, and the passenger compartment is cooled. During the maximum cooling of the face mode, an entire inside air mode is generally set and only inside air is introduced, so that cooling capacity of the passenger compartment can be improved.

Figure 13:
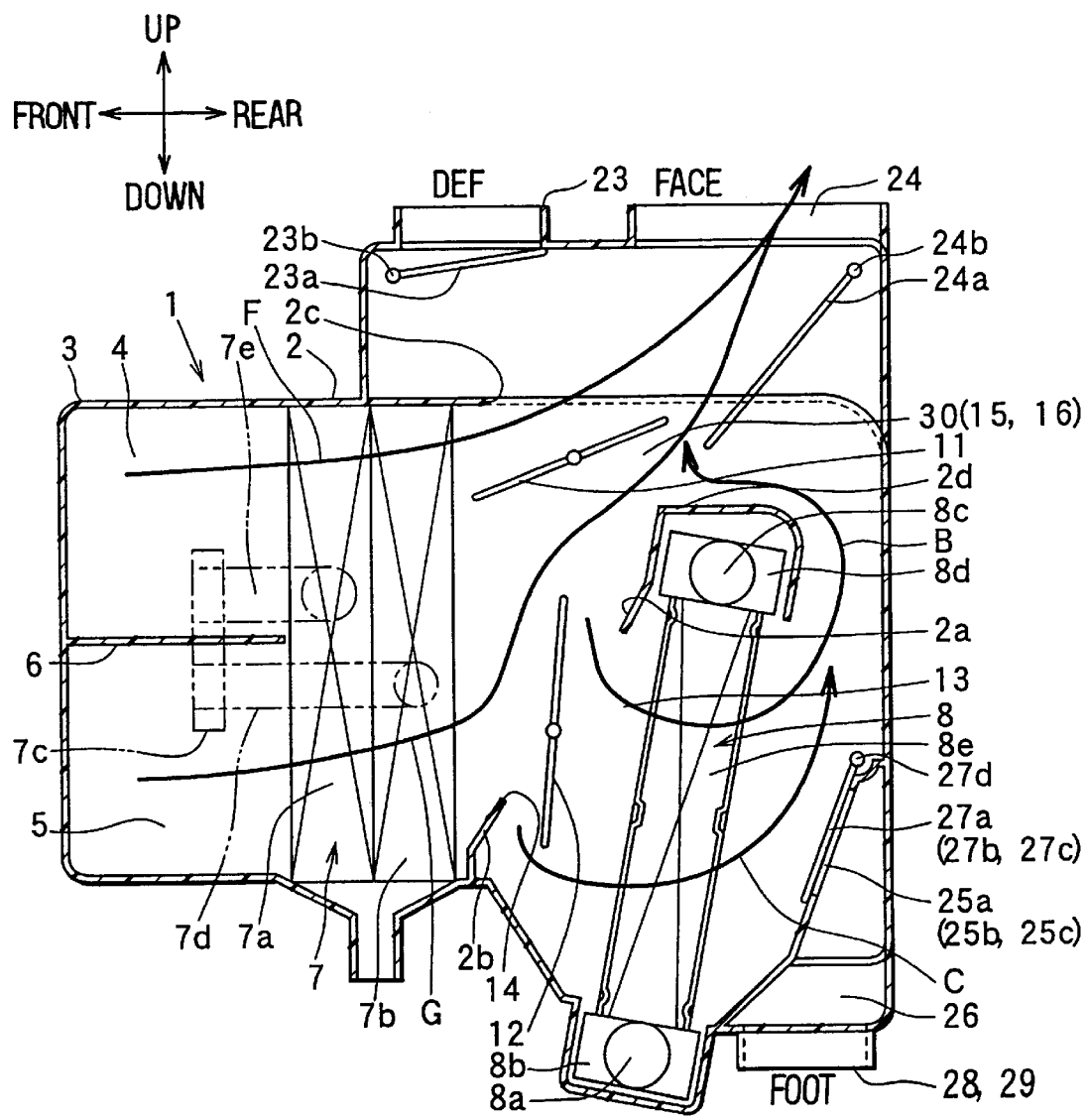
FIG. 13 is a schematic vertical sectional view of the air conditioner during the face mode at 3/10 rotation position of the driving lever, according to the embodiment.

FIG. 13 shows a temperature control area during the face mode, in which the rotation position of the driving lever 43 is set at 3/10 position. In this case, as shown the graph in FIG. 8, the defroster/face cool air passage 30 and the foot cool air passages 15, 16 are opened by the first air mixing door 11 with 75% opening degree, and the inlet opening portion 14 of the warm air passage 13 is opened by the second air mixing door 12 with 33% opening degree. As a result, warm air having passed through the heat-exchanging portion 8e of the heater core 8 flows toward the face opening portion 24 as shown by arrows B, C in FIG. 13, and cool air having passed through the evaporator 7 flows toward the face opening portion 24 after passing through the defroster/ face cool air passage 30 as shown by arrows F, G in FIG. 13. Thus, at an inlet side of the face opening portion 24, cool air and warm air are mixed to have a predetermined low temperature. Thereafter, the conditioned cool air is blown toward the upper area of the passenger in the passenger compartment from the face air outlet, so that the passenger compartment is cooled.

When the first and second air mixing doors 11, 12 are rotated from the maximum cooling position toward the maximum heating side, an increased ratio of the opening degree of the inlet opening portion 14 due to the second air mixing door 12 becomes larger than a reduced ratio of the opening degree of the cool air passages 15, 16, 30 due to the first air mixing door 11. Therefore, the second air mixing door 12 is moved toward the heating side in precedent to the first air mixing door 11.

Thus, during the face mode, when the air outlet mode is changed from the maximum cooling to the temperature control area, it can effectively prevent the warm air amount from being suddenly increased because the decreased ratio of cool air amount is made small. Thus, the temperature of air blown from the face air outlet can be smoothly controlled, and pleasant air conditioning can be given to the passenger in the passenger compartment.

Figure 14:
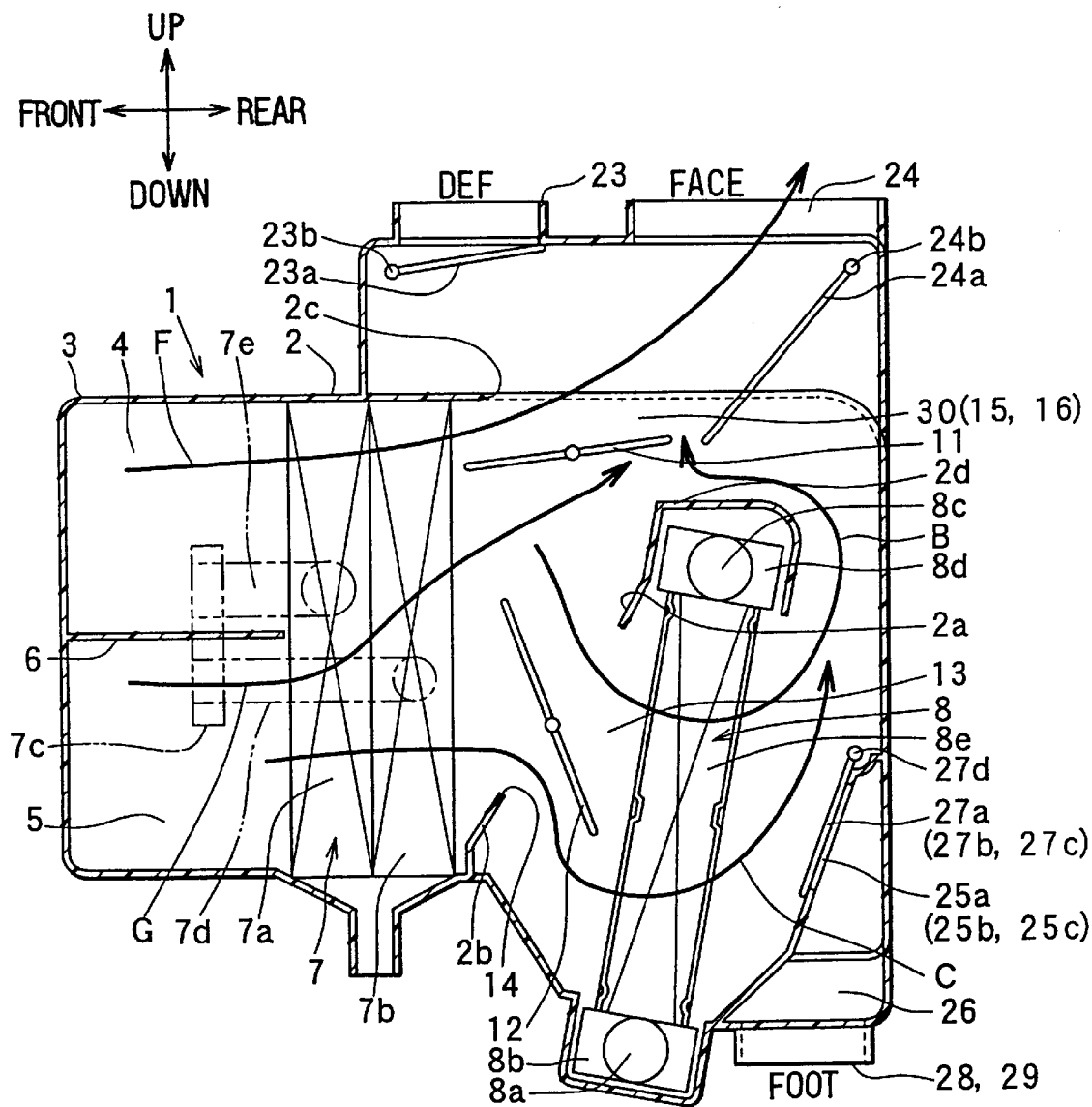
FIG. 14 is a schematic vertical sectional view of the air conditioner during the face mode at 5/10 rotation position of the driving lever, according to the embodiment.
Figure 15:
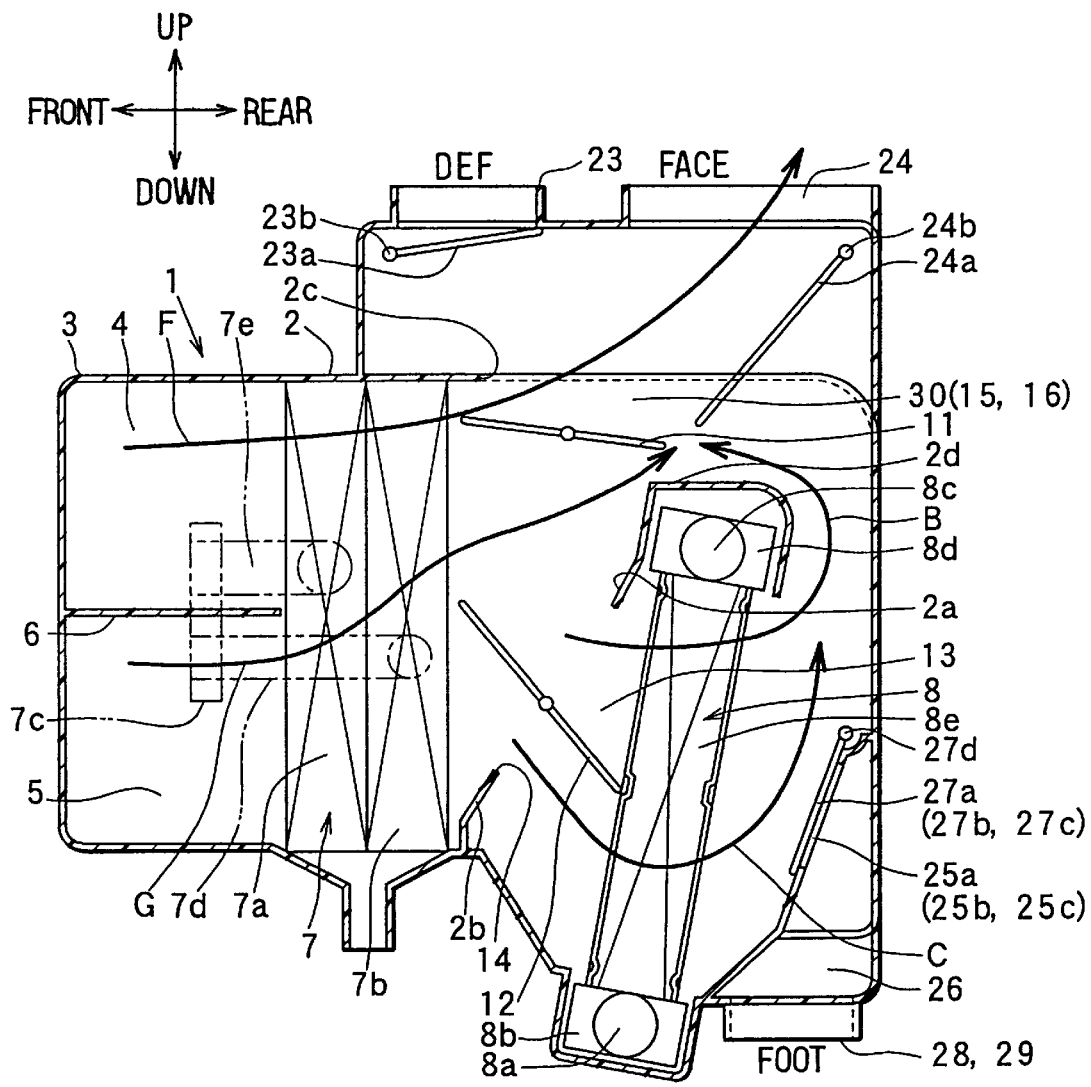
FIG. 15 is a schematic vertical sectional view of the air conditioner during the face mode at 7/10 rotation position of the driving lever, according to the embodiment.
Figure 16:
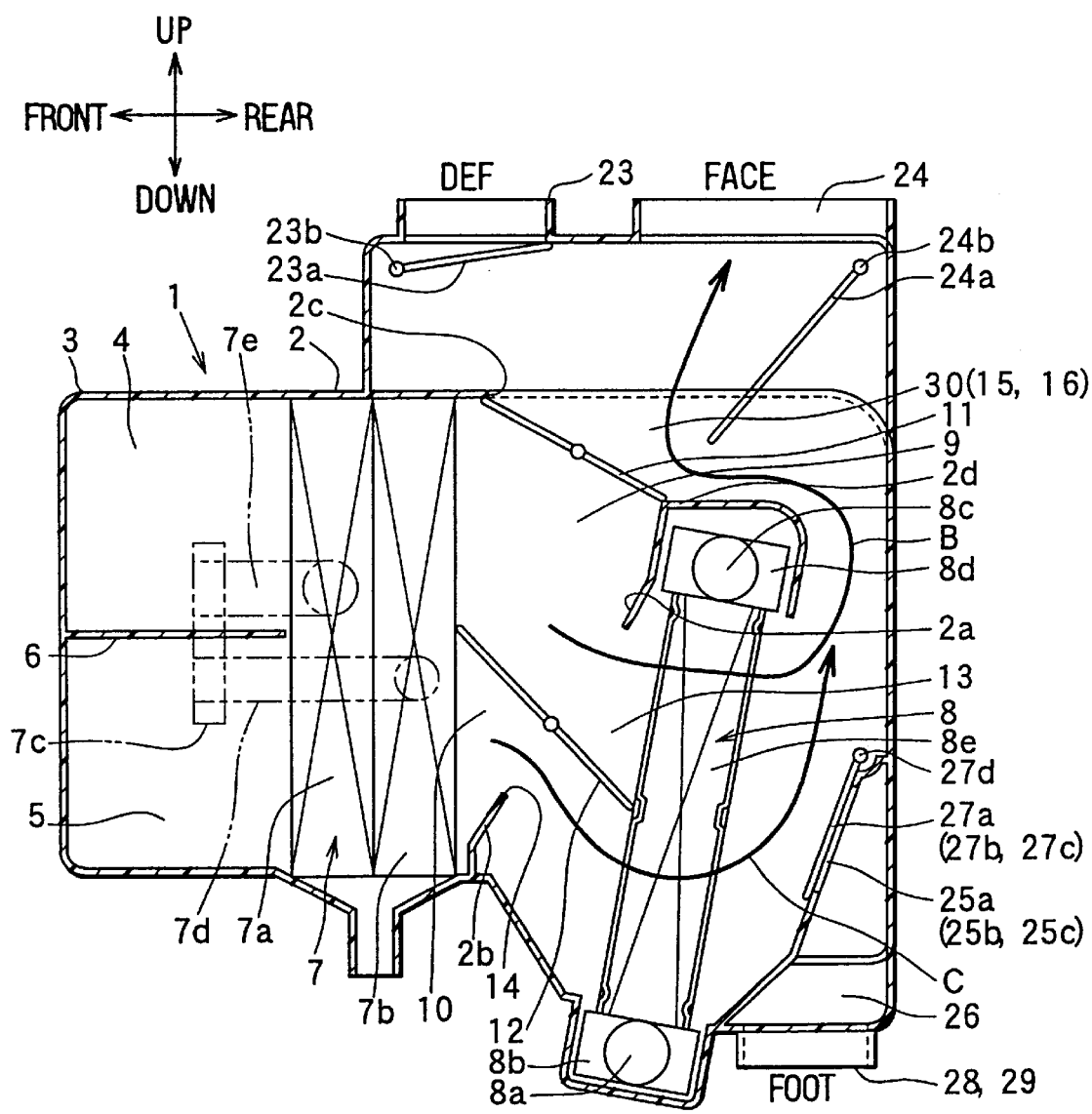
FIG. 16 is a schematic vertical sectional view of the air conditioner during the face mode at 10/10 rotation position (maximum heating) of the driving lever, according to the embodiment.

FIG. 14 shows a temperature control area during the face mode when the rotation position of the driving lever 43 is set at the 5/10 rotation position. FIG. 15 shows a temperature control area during the face mode when the rotation position of the driving lever 43 is set at the 7/10 rotation position. Further, FIG. 16 shows a maximum heating during the face mode when the rotation position of the driving lever 43 is set at the 10/10 rotation position.

In the temperature control area of the face mode, generally, the entire outside air mode or a half inside air mode in which outside air is mixed into inside air is set so that the passenger compartment is ventilated.

(5) BI-LEVEL MODE

Figure 17:
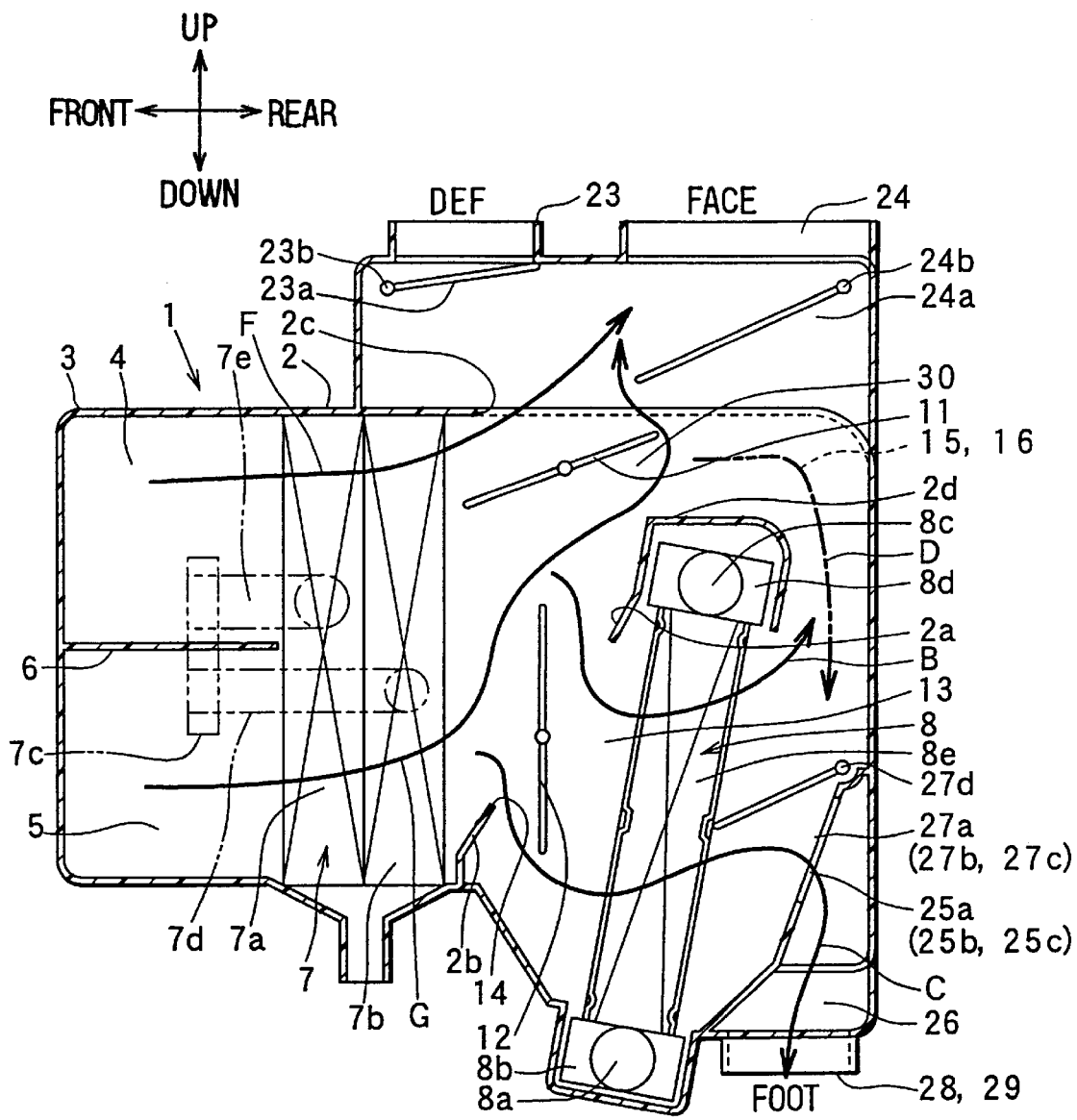
FIG. 17 is a schematic vertical sectional view of the air conditioner during a bi-level mode according to the embodiment.

During the bi-level mode shown in FIG. 17, the defroster opening portion 23 is fully closed by the defroster door 23a, the three foot opening portions 25a, 25b, 25c are fully opened by the foot doors 27a, 27b, 27c, and the face opening portion 24 is opened with an intermediate opening degree by the face door 24a. Further, the first and second air mixing doors 11, 12 are rotated at intermediate positions between the maximum cooling and the maximum heating. As a result, cool air having passed through the evaporator 7 flows toward the face opening portion 24 as shown by arrows F, G, and warm air having passed through the upper side portion of the heat-exchanging portion 8e of the heater core 8 also flows toward the face opening portion 24 as shown by arrow B. Therefore, the cool air and the warm air are mixed, and the mixed air is blown toward the upper side of the passenger compartment from the face opening portion 24. Simultaneously, warm air having passed through the lower side portion of the heat-exchanging portion 8e of the heater core 8 flows into the air mixing chamber 26 after passing through the center foot opening portion 25a as shown by arrow C in FIG. 17, and cool air immediately after the evaporator 7 flows into the air mixing chamber 26 after passing through the foot cool air passages 15, 16 and the right and left foot opening portions 25b, 25c as shown by arrow D in FIG. 17. The warm air and the cool air are mixed in the air mixing chamber 26, and the mixed air is blown toward the lower side of the passenger compartment from the foot air outlets 28, 29. During the bi-level mode, the half inside air mode or the entire outside air mode is generally set so that the passenger compartment is ventilated.

According to the embodiment of the present invention, the first and second air mixing doors 11, 12 are butterfly doors in which the rotation shafts 11a, 12a are disposed at the center portions in the door width dimension $L_1$, $L_2$. Firstly, the second air mixing door 12 will be described. The rotation shaft 12a of the second air mixing door 12 is disposed at an approximate center portion between the evaporator 7 and the heater core 8, and the second air mixing door 12 is rotated around the rotation shaft 12a. Therefore, when the second air mixing door 12 is rotated from the maximum cooling position where the inlet opening portion 14 is fully closed as shown in FIG. 5 to the maximum heating position where the inlet opening portion 14 is fully opened as shown in FIG. 3, the rotation angle of the second air mixing door 12 is small (e.g., 60°). Even when the rotation angle of the second air mixing door 12 is small from the maximum cooling to the maximum heating, the second air mixing door 12 can be rotated to a position approximately vertically relative to an opening surface of the inlet opening portion 14. Thus, during the maximum heating, air can flow through face and back sides of the second air mixing door 12 as shown by arrows B, C, and the inlet opening portion 14 can be fully opened. As a result, a distance $L_0$ between the evaporator 7 and the heater core 8, intersecting the rotation shaft 12a, can be made smaller than the door width dimension $L_2$ of the second door 12. Thus, the dimension L (FIG. 2) of the air conditioner 1 in the vehicle front-rear direction can be reduced, and the air conditioner 1 can be readily mounted on the vehicle.

Further, when the second air mixing door 12 is rotated from the maximum cooling position shown in FIG. 5 to the maximum heating position shown in FIG. 3, the maximum heating position of the second air mixing door 12 is the rotation end of the anticlockwise rotation direction. Therefore, at the maximum heating position of the second air mixing door 12 shown in FIG. 3, the rotation end of the second air mixing door 12 can be set so that the seal member 12c of the second air mixing door 12 can be proximate to the center positions of the evaporator 7 and the heater core 8 in the up-down direction. Further, because the maximum heating position of the second air mixing door 12 is the rotation end thereof, the seal member 12c of the second air mixing door 12 can air-tightly contact the evaporator 7 and the heater core 8 during the maximum heating of the foot mode. Thus, during the double-layer flow mode, separation performance between outside air flowing through the first air passage 9 and inside air flowing through the second air passage 10 can be improved, thereby improving defrosting performance of the windshield.

Further, because the first air mixing door 11 is also the butterfly door, the cool air passages 15, 16, 30 can be opened and closed by the first air mixing door 11 with a relatively small rotation angle (e.g., approximately 60°) between the maximum cooling position shown in FIG. 5 and the maximum heating position shown in FIG. 3. Therefore, at the maximum cooling position of the first air mixing door 11 as shown in FIG. 12, face and back side air passages of the first air mixing door 11 can be made sufficiently larger while attachment space of the first air mixing door 11 can be reduced.

Although the present invention has been fully described in connection with the preferred embodiment thereof with reference to the accompanying drawings, it is to be noted that various changes and modifications will become apparent to those skilled in the art.

For example, in the above-described embodiment of the present invention, the air conditioner 1 is disposed at a center position in the vehicle right-left direction, and the blower unit is shifted from the air conditioner 1 in the vehicle right-left direction. However, the present invention may be applied to an entire center type air conditioner in which the blower unit is disposed at a vehicle front side of the air conditioner 1 at the center in the vehicle right-left direction. Further, the present invention may be applied to an air conditioner mounted on the other position of the vehicle.

Such changes and modifications are to be understood as being within the scope of the present invention as defined by the appended claims.

What is claimed is:

1. An air conditioner for a vehicle having a passenger compartment, said air conditioning comprising:

an air conditioning case for forming an air passage, said air conditioning case having a first opening portion for blowing air toward a lower portion of the passenger compartment and a second opening portion for blowing air toward an inner surface of a windshield;

a cooling heat exchanger for cooling air passing through said air passage;

a heating heat exchanger for heating air passing therethrough, said heating heat exchanger being disposed at a downstream air side of said cooling heat exchanger to form a bypass passage through which air having passed through said cooling heat exchanger bypasses said heating heat exchanger; and a temperature control unit which adjusts temperature of air blown into the passenger compartment by adjusting a ratio between an amount of air passing through said heating heat exchanger and an amount of air passing through said bypass passage, said temperature control unit including a first door for adjusting an opening degree of said bypass passage and a second door for adjusting an opening degree of a warm air passage through which air passes through said heating heat exchanger, wherein:

said first door is a butterfly door having a rotation shaft at a center in a door width direction;

said second door is a butterfly door having a rotation shaft at a center in a door width direction, said rotation shaft of said second door being disposed between said cooling heat exchanger and said heating heat exchanger; and said second door is disposed to fully open said warm air passage and to partition an air passage between said cooling heat exchanger and said heating heat exchanger into a first air passage through which outside air outside the passenger compartment flows and a second air passage through which inside air inside the passenger compartment flows, when a double-layer flow mode where inside air in said second air passage flows into said first opening portion and outside air in said first air passage flows into said second opening portion is set during an air outlet mode where both of said first opening portion and second opening portion are opened.

2. The air conditioner according to claim 1, wherein said cooling heat exchanger and said heating heat exchanger are disposed to have a distance ($L_0$) therebetween at a position intersecting the rotation shaft of said second door, said distance ($L_0$) being smaller than a width dimension ($L_2$) of said second door in the door width direction.

3. The air conditioner according to claim 1, wherein the double-layer flow mode is set when a maximum heating for the passenger compartment is set.

4. The air conditioner according to claim 3, further comprising:

a door operation member for operatively linking said first and second doors, wherein said door operation member is operated in such a manner that said first door fully opens said bypass passage and said second door fully closes said warm air passage during a maximum cooling.

5. The air conditioner according to claim 4, wherein:

when said first and second doors are moved from the maximum cooling toward the maximum heating, said door operation member is operated in such a manner that said second door is moved toward the maximum heating in precedent to said first door.

6. The air conditioner according to claim 5, wherein:

when said second door is moved from the maximum cooling toward the maximum heating in precedent to said first door, an opening-degree increase ratio of said warm air passage from a fully closing to a fully opening due to said second door becomes larger than an opening-degree decrease ratio of said bypass passage from a fully opening to a fully closing due to said first door.

7. The air conditioner according to claim 1, wherein:

said bypass passage is provided above said heating heat exchanger;

said air conditioning case has a seal surface at an upper side of said heating heat exchanger; and said first door has a top end which contacts said seal surface when said first door fully closes said bypass passage.

8. The air conditioner according to claim 1, wherein:

said air conditioning case is disposed in an instrument panel at a vehicle front side of the passenger compartment in such a manner that air flows through said air passage from a vehicle front side to a vehicle rear side; and said cooling heat exchanger is disposed at a vehicle front side of said heating heat exchanger in said air conditioning case.

9. The air conditioner according to claim 8, wherein said air conditioning case has a longest dimension in a vehicle right-left direction.

10. The air conditioner according to claim 1, wherein:

each rotation shaft of said first and second doors extends in a vehicle right-left direction; and said first and second doors are rotated around said rotation shafts thereof, respectively.

11. The air conditioner according to claim 1, wherein:

said second door has first and second top ends approximately parallel to said rotation shaft of said second door; and said first end of said second door contacts said cooling heat exchanger at an approximate center position of said cooling heat exchanger and said second end of said second door contacts said heating heat exchanger at an approximate center position of said heating heat exchanger, during said double-layer flow mode.

12. The air conditioner according to claim 1, wherein said second door is rotated with a rotation angle from a maximum cooling to a maximum heating, said rotation angle being smaller than 90°.

13. The air conditioner according to claim 12, wherein said second door is rotated to a rotation end position between said cooling heat exchanger and said heating heat exchanger during the double-layer flow mode.

14. The air conditioner according to claim 1, further comprising:

a first fan for blowing outside air into said first air passage; and a second fan for blowing inside air into said second air passage.

15. The air conditioner according to claim 1, further comprising:

a foot door for opening and closing said first opening portion, wherein an air passage at a direct downstream air side of said heating heat exchanger is partitioned by said foot door into said first and second air passages when said foot door fully opens said first opening portion.

16. The air conditioner according to claim 1, wherein said bypass passage is opened and closed by only said first door, and said warm air passage is opened and closed by only said second door.

17. An air conditioner for a vehicle having a passenger compartment and an instrument panel at a vehicle front side of the passenger compartment, said air conditioner comprising:

an air conditioning case disposed within the instrument panel for forming an air passage through which air flows from a vehicle front side to a vehicle rear side, said air conditioning case having a first opening portion for blowing air toward a lower portion of the passenger compartment and a second opening portion for blowing air toward an inner surface of a windshield;

a cooling heat exchanger for cooling air passing through said air passage;

a heating heat exchanger for heating air passing therethrough, said heating heat exchanger being disposed at a downstream air side of said cooling heat exchanger to form a bypass passage through which air having passed through said cooling heat exchanger bypasses said heating heat exchanger; and a temperature control unit for adjusting temperature of air blown into the passenger compartment, said temperature control unit including a first door for adjusting an opening degree of said bypass passage and a second door for adjusting an opening degree of an air inlet portion of said heating heat exchanger, wherein:

said first door is a butterfly door having a rotation shaft at a center in a door width direction;

said second door is a butterfly door having a rotation shaft at a center in a door width direction, said rotation shaft of said second door being disposed between said cooling heat exchanger and said heating heat exchanger to extend in a vehicle right-left direction; and said second door is disposed to partition said air passage between said cooling heat exchanger and said heating heat exchanger into a first air passage through which outside air outside the passenger compartment flows and a second air passage through which inside air inside the passenger compartment flows, when a double-layer flow mode where inside air in said second air passage flows into said first opening portion and outside air in said first air passage flows into said second opening portion is set.

18. The air conditioner according to claim 17, wherein said second door fully opens said air inlet portion of said heating heat exchanger and said first door fully closes said bypass passage during said double-layer flow mode.

19. The air conditioner according to claim 17, wherein:

said first door is disposed between said cooling heat exchanger and said heating heat exchanger.

20. The air conditioner according to claim 17, wherein said cooling heat exchanger and said heating heat exchanger are disposed to have a distance ($L_0$) therebetween at a position intersecting the rotation shaft of said second door, the distance ($L_0$) being smaller than a width dimension ($L_2$) of said second door in the door width direction.

* * * * *